(12) United States Patent
Heath et al.

(10) Patent No.: US 12,059,734 B2
(45) Date of Patent: Aug. 13, 2024

(54) HOLE SAW WITH CIRCULAR SIDEWALL OPENINGS

(71) Applicant: Milwaukee Electric Tool Corporation, Brookfield, WI (US)

(72) Inventors: Peter Russell Heath, Wauwatosa, WI (US); Christopher J. Rechlin, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 572 days.

(21) Appl. No.: 17/114,048

(22) Filed: Dec. 7, 2020

(65) Prior Publication Data

US 2021/0086272 A1 Mar. 25, 2021

Related U.S. Application Data

(63) Continuation of application No. PCT/US2020/038167, filed on Jun. 17, 2020.

(60) Provisional application No. 62/864,293, filed on Jun. 20, 2019.

(51) Int. Cl.
*B23B 51/04* (2006.01)

(52) U.S. Cl.
CPC .......... *B23B 51/0467* (2022.01); *B23B 51/04* (2013.01)

(58) Field of Classification Search
CPC ..... B23B 51/0467; B23B 51/04; B23B 51/05; B23B 2251/248; B23B 2251/406
See application file for complete search history.

(56) References Cited

U.S. PATENT DOCUMENTS

| | | | |
|---|---|---|---|
| 118,806 | A | 9/1871 | Lafferty et al. |
| 308,842 | A | 12/1884 | Hunt |
| 1,123,730 | A | 1/1915 | Greenfield |
| 1,629,581 | A * | 5/1927 | Machlet ............... B23D 61/025 |
| | | | 175/379 |
| 2,015,339 | A | 9/1935 | Ellingham |
| 2,062,257 | A | 11/1936 | Douglas et al. |
| 2,237,901 | A | 4/1941 | Chun |
| 2,319,528 | A | 5/1943 | Barbour et al. |
| 2,349,400 | A | 5/1944 | Wendell |
| 2,412,433 | A | 12/1946 | Taylor |
| 2,427,085 | A | 9/1947 | Allison |

(Continued)

FOREIGN PATENT DOCUMENTS

| | | |
|---|---|---|
| CN | 2303698 | 1/1999 |
| CN | 201799668 | 4/2011 |

(Continued)

OTHER PUBLICATIONS

U.S. Appl. No. 29/656,110, filed Jul. 10, 2018.

(Continued)

*Primary Examiner* — Alan Snyder
(74) *Attorney, Agent, or Firm* — Reinhart Boerner Van Deuren s.c.

(57) ABSTRACT

A hole saw including a plurality of sidewall openings is provided. The sidewall openings are shaped and grouped in patterns that improve debris ejection of the hole saw, and that allows for easy access to the interior of the hole saw for manual debris removal by the user. The opening groups are space from each other by larger uninterrupted areas such that the hole saw has a high strength despite the number and size of openings provided in the saw sidewall.

24 Claims, 16 Drawing Sheets

(56) References Cited

U.S. PATENT DOCUMENTS

| | | |
|---|---|---|
| 2,444,099 A | 6/1948 | Hennessey, Jr. |
| 2,473,077 A | 6/1949 | Starbuck, Jr. |
| 2,615,245 A | 10/1952 | Schaumleffel |
| 2,662,428 A | 12/1953 | Mueller |
| 2,779,361 A | 3/1954 | McKiff |
| 2,680,898 A | 6/1954 | Diosi, Sr. |
| 2,754,864 A | 7/1956 | Elsy |
| 2,800,812 A | 7/1957 | Mueller et al. |
| 2,923,180 A | 2/1960 | Dunn |
| 2,951,683 A | 9/1960 | Tilden |
| 2,969,122 A | 1/1961 | Steffes |
| 3,025,917 A | 3/1962 | Knoblauch |
| 3,074,392 A | 1/1963 | Fisher |
| 3,162,067 A | 12/1964 | Koons et al. |
| 3,265,104 A | 8/1966 | Gallo, Sr. |
| 3,331,455 A | 7/1967 | Anderson, Jr. et al. |
| 3,374,696 A | 3/1968 | Trevathan |
| 3,382,743 A | 5/1968 | Trevathan |
| 3,494,348 A | 2/1970 | Lindblad |
| 3,495,359 A | 2/1970 | Smith et al. |
| 3,647,310 A | 3/1972 | Morse |
| 3,778,179 A | 12/1973 | Rivas |
| 3,824,026 A | 7/1974 | Gaskins |
| 3,836,278 A | 9/1974 | Mcinnes |
| 3,870,431 A | 3/1975 | Luckenbi, II et al. |
| 3,880,546 A | 4/1975 | Segal |
| 3,920,350 A | 11/1975 | Southall |
| 3,973,862 A | 8/1976 | Segal |
| 3,976,387 A | 8/1976 | Segal |
| 3,997,279 A | 12/1976 | Porter |
| 4,072,441 A | 2/1978 | LaPointe |
| 4,077,737 A | 3/1978 | Morse |
| 4,078,458 A | 3/1978 | Berendzen |
| 4,101,238 A | 7/1978 | Reibetanz et al. |
| 4,147,464 A | 4/1979 | Watson et al. |
| 4,148,593 A | 4/1979 | Clark |
| 4,189,015 A | 2/1980 | Acker et al. |
| 4,201,502 A | 5/1980 | Skendrovic |
| 4,203,692 A | 5/1980 | Jensen |
| 4,225,275 A | 9/1980 | Elliott |
| 4,303,357 A | 12/1981 | Makar |
| 4,330,229 A | 5/1982 | Croydon |
| 4,422,811 A | 12/1983 | Ellison et al. |
| D278,065 S | 3/1985 | Sydlowski et al. |
| 4,527,449 A | 7/1985 | Sydlowski et al. |
| 4,529,341 A | 7/1985 | Greene |
| D282,369 S | 1/1986 | de Villiers |
| 4,565,471 A | 1/1986 | Negishi et al. |
| 4,568,227 A | 2/1986 | Hogg |
| 4,582,458 A | 4/1986 | Korb et al. |
| 4,595,321 A | 6/1986 | Van Dalen |
| 4,605,347 A | 8/1986 | Jodock et al. |
| 4,741,651 A | 5/1988 | Despres |
| 4,755,087 A | 7/1988 | Parent |
| 4,759,667 A | 7/1988 | Brown |
| 4,760,643 A | 8/1988 | Juma |
| D303,118 S | 8/1989 | Cox |
| 4,906,146 A | 5/1990 | Bowling |
| 4,961,674 A | 10/1990 | Wang et al. |
| 4,968,189 A | 11/1990 | Pidgeon |
| 4,968,193 A | 11/1990 | Chaconas et al. |
| 5,007,777 A | 4/1991 | Itokazu |
| D317,455 S | 6/1991 | Martin |
| 5,025,871 A | 6/1991 | Stewart et al. |
| 5,049,010 A | 9/1991 | Oakes |
| 5,061,126 A | 10/1991 | Cain et al. |
| D321,894 S | 11/1991 | Harris |
| 5,069,584 A | 12/1991 | Obermeier et al. |
| 5,076,741 A | 12/1991 | Litlehorn |
| 5,096,341 A | 3/1992 | Despres |
| 5,098,234 A | 3/1992 | Judkins et al. |
| 5,115,796 A | 5/1992 | Schweickhardt |
| 5,145,018 A | 9/1992 | Schimke et al. |
| 5,171,111 A | 12/1992 | Kishimoto |
| D332,492 S | 1/1993 | Rosenberg et al. |
| D334,016 S | 3/1993 | Jonsson |
| 5,205,685 A | 4/1993 | Herbert |
| D342,270 S | 12/1993 | Kwang |
| 5,273,380 A | 12/1993 | Musacchia |
| 5,288,183 A | 2/1994 | Chaconas et al. |
| 5,291,806 A | 3/1994 | Bothum |
| 5,316,416 A | 5/1994 | Kim |
| 5,353,552 A | 10/1994 | Hemmings |
| 5,392,759 A | 2/1995 | Kwang |
| 5,415,504 A | 5/1995 | Wolf et al. |
| 5,435,672 A | 7/1995 | Hall et al. |
| 5,451,128 A | 9/1995 | Hattersley |
| D363,294 S | 10/1995 | Ellis |
| 5,466,100 A | 11/1995 | Ahluwalia |
| D372,485 S | 8/1996 | Stone et al. |
| 5,556,399 A | 9/1996 | Huebner |
| D376,809 S | 12/1996 | Stone et al. |
| 5,649,796 A | 7/1997 | Durney |
| 5,651,646 A | 7/1997 | Banke et al. |
| 5,690,452 A | 11/1997 | Baublits |
| 5,700,113 A | 12/1997 | Stone et al. |
| D391,974 S | 3/1998 | Brutscher |
| D392,297 S | 3/1998 | Brutscher |
| D394,663 S | 5/1998 | Stone et al. |
| 5,762,498 A | 6/1998 | Gonzalez |
| 5,803,677 A | 9/1998 | Brutscher et al. |
| 5,810,524 A | 9/1998 | Wirth, Jr. et al. |
| 5,816,754 A | 10/1998 | Shallenberger |
| 5,842,820 A | 12/1998 | Lee et al. |
| 5,888,036 A | 3/1999 | Arai et al. |
| D408,424 S | 4/1999 | Schmotzer |
| 5,904,454 A | 5/1999 | Washer |
| 5,931,615 A | 8/1999 | Wiker |
| 5,934,845 A | 8/1999 | Frey |
| 5,980,169 A | 11/1999 | Hinch |
| 6,007,279 A | 12/1999 | Malone, Jr. |
| D419,576 S | 1/2000 | Burcher et al. |
| 6,036,410 A | 3/2000 | Shun'ko |
| 6,050,754 A | 4/2000 | Thomas |
| 6,113,321 A | 9/2000 | Mulroy et al. |
| 6,126,367 A | 10/2000 | Reed |
| 6,152,815 A | 11/2000 | Meerdink et al. |
| 6,167,792 B1 | 1/2001 | Korb et al. |
| D438,219 S | 2/2001 | Brutscher |
| 6,190,097 B1 | 2/2001 | Thomas |
| 6,206,616 B1 | 3/2001 | Smith et al. |
| 6,267,542 B1 | 7/2001 | Salmon |
| 6,269,722 B1 | 8/2001 | Hellbergh |
| 6,273,652 B1 | 8/2001 | Wirth, Jr. et al. |
| D447,495 S | 9/2001 | Strobel et al. |
| 6,341,925 B1 | 1/2002 | Despres |
| D455,446 S | 4/2002 | Collins |
| 6,409,436 B1 | 6/2002 | Despres |
| 6,419,428 B2 | 7/2002 | Ajimi et al. |
| 6,428,250 B2 | 8/2002 | Giebmanns |
| 6,431,289 B1 | 8/2002 | Potter et al. |
| 6,443,674 B1 | 9/2002 | Jaconi |
| 6,564,887 B2 | 5/2003 | Hong |
| 6,588,310 B2 | 7/2003 | Lee et al. |
| 6,588,992 B2 | 7/2003 | Rudolph |
| 6,599,063 B1 | 7/2003 | Capstran |
| D478,105 S | 8/2003 | Morton et al. |
| D478,106 S | 8/2003 | Morton et al. |
| D478,339 S | 8/2003 | Morton et al. |
| D478,919 S | 8/2003 | Morton et al. |
| 6,619,413 B2 | 9/2003 | Hamilton et al. |
| 6,641,338 B2 | 11/2003 | Despres |
| 6,641,395 B2 | 11/2003 | Kumar et al. |
| 6,652,203 B1 | 11/2003 | Risen, Jr. |
| 6,676,342 B2 | 1/2004 | Mast et al. |
| 6,676,711 B2 | 1/2004 | Omi |
| 6,698,981 B1 | 3/2004 | Beno et al. |
| 6,705,807 B1 | 3/2004 | Rudolph et al. |
| 6,746,187 B2 | 6/2004 | Alm |
| 6,786,684 B1 | 9/2004 | Ecker |
| D497,547 S | 10/2004 | Kumakura et al. |
| 6,817,428 B1 | 11/2004 | Miyanaga |
| 6,817,936 B1 | 11/2004 | Skeem et al. |
| 6,820,519 B2 | 11/2004 | Lefebvre |

(56) References Cited

U.S. PATENT DOCUMENTS

| | | |
|---|---|---|
| 6,857,831 B2 | 2/2005 | Davis |
| 6,857,832 B2 | 2/2005 | Nygard |
| 6,863,529 B2 | 3/2005 | Strong et al. |
| D504,446 S | 4/2005 | Kobayashi |
| 6,884,245 B2 | 4/2005 | Spranza |
| 6,890,132 B1 | 5/2005 | Baron et al. |
| 6,890,133 B2 | 5/2005 | Singh et al. |
| 6,893,194 B2 | 5/2005 | Jones et al. |
| D507,585 S | 7/2005 | Held |
| 6,939,092 B2 | 9/2005 | Korb et al. |
| 6,945,414 B1 | 9/2005 | Stevens et al. |
| 6,945,850 B2 | 9/2005 | Perrey |
| 6,948,574 B2 | 9/2005 | Cramer et al. |
| 6,988,859 B2 | 1/2006 | Borschert et al. |
| 7,001,116 B2 | 2/2006 | Kozak |
| D516,594 S | 3/2006 | Morton |
| 7,017,465 B2 | 3/2006 | Dion et al. |
| 7,018,143 B2 | 3/2006 | Moore |
| D519,531 S | 4/2006 | Kobashi |
| D523,398 S | 6/2006 | Ellis |
| D526,670 S | 8/2006 | Ibey |
| 7,112,016 B2 | 9/2006 | Nordlin |
| D529,525 S | 10/2006 | Waldron et al. |
| 7,127,923 B2 | 10/2006 | Biederman et al. |
| 7,140,451 B2 | 11/2006 | Yoshimizu et al. |
| 7,160,064 B2 | 1/2007 | Jasso |
| 7,175,372 B2 | 2/2007 | Davis |
| 7,201,543 B2 | 4/2007 | Muhlfriedel et al. |
| D544,892 S | 6/2007 | Watson et al. |
| 7,237,291 B2 | 7/2007 | Redford |
| 7,237,984 B1 | 7/2007 | Guzda et al. |
| 7,237,986 B2 | 7/2007 | Anjanappa et al. |
| 7,246,975 B2 | 7/2007 | Corso et al. |
| D551,269 S | 9/2007 | Burke, III |
| 7,264,428 B2 | 9/2007 | Cossette |
| 7,267,514 B2 | 9/2007 | Wetzl et al. |
| 7,275,898 B2 | 10/2007 | Malagnino et al. |
| 7,306,411 B2 | 12/2007 | Mabuchi et al. |
| D559,874 S | 1/2008 | Kobayashi |
| D560,699 S | 1/2008 | Omi |
| D571,835 S | 6/2008 | Concari et al. |
| D573,165 S | 7/2008 | Grundvig |
| D575,808 S | 8/2008 | Zeiler et al. |
| 7,438,509 B1 | 10/2008 | Wong et al. |
| D580,462 S | 11/2008 | Liao et al. |
| 7,476,067 B2 | 1/2009 | Borschert et al. |
| D585,919 S | 2/2009 | Cantlon |
| D585,920 S | 2/2009 | Liao et al. |
| 7,488,146 B2 | 2/2009 | Brunson |
| D588,175 S | 3/2009 | Morton |
| D588,884 S | 3/2009 | Burke, III |
| 7,513,718 B1 | 4/2009 | Arnold |
| 7,520,703 B2 | 4/2009 | Rempel |
| 7,556,459 B2 | 7/2009 | Rempel |
| 7,637,703 B2 | 12/2009 | Khangar et al. |
| D608,801 S | 1/2010 | Evatt et al. |
| D608,802 S | 1/2010 | Ibarra et al. |
| 7,658,136 B2 | 2/2010 | Rempel et al. |
| 7,658,576 B1 | 2/2010 | Buzdum et al. |
| 7,661,913 B2 | 2/2010 | Nordlin |
| 7,665,935 B1 | 2/2010 | Garrick et al. |
| 7,674,078 B1 | 3/2010 | Buzdum et al. |
| D615,839 S | 5/2010 | Richter et al. |
| 7,766,583 B2 | 8/2010 | Kozak |
| 7,824,137 B2 | 11/2010 | Vasudeva et al. |
| 7,850,405 B2 | 12/2010 | Keightley |
| D630,656 S | 1/2011 | Lambert et al. |
| 7,871,224 B2 | 1/2011 | Dost et al. |
| 7,892,235 B2 | 2/2011 | Ellis |
| D634,343 S | 3/2011 | Burke, III |
| 7,913,601 B2 | 3/2011 | Petts et al. |
| 7,934,893 B2 | 5/2011 | Gillissen |
| 7,938,600 B1 | 5/2011 | Griep et al. |
| 7,959,371 B2 | 6/2011 | Keightley |
| 7,967,535 B2 | 6/2011 | Eiserer et al. |
| 7,988,389 B2 | 8/2011 | Miebach |
| 8,042,613 B2 | 10/2011 | Hallundbaek et al. |
| 8,052,356 B2 | 11/2011 | Singh |
| D659,176 S | 5/2012 | Novak et al. |
| D664,574 S | 7/2012 | Burke, III |
| 8,328,474 B2 | 12/2012 | Pangerc et al. |
| 8,328,476 B2 | 12/2012 | O'Keefe et al. |
| D687,472 S | 8/2013 | Novak et al. |
| D690,334 S | 9/2013 | Zielonka et al. |
| D692,470 S | 10/2013 | Novak et al. |
| 8,573,907 B2 | 11/2013 | Kalomeris et al. |
| 8,579,554 B2 | 11/2013 | Novak et al. |
| 8,579,555 B2 | 11/2013 | Novak et al. |
| 8,646,601 B2 | 2/2014 | Green et al. |
| D701,544 S | 3/2014 | Novak et al. |
| D706,845 S | 6/2014 | Richter |
| D708,650 S | 7/2014 | Richter |
| 8,790,052 B2 | 7/2014 | Baratta |
| D711,441 S | 8/2014 | Novak et al. |
| 8,840,344 B2 | 9/2014 | Stenman |
| 9,662,720 B2 | 5/2017 | Richter |
| 2002/0037201 A1 | 3/2002 | Despres |
| 2003/0103822 A1 | 6/2003 | Wirth et al. |
| 2003/0133765 A1 | 7/2003 | Capriotti |
| 2003/0146024 A1 | 8/2003 | Cramer et al. |
| 2003/0177645 A1 | 9/2003 | Flury et al. |
| 2004/0179911 A1 | 9/2004 | Keightley |
| 2005/0031422 A1 | 2/2005 | Tseng |
| 2005/0105981 A1 | 5/2005 | Byrley et al. |
| 2007/0020056 A1 | 1/2007 | Burdick |
| 2007/0059113 A1 | 3/2007 | Capstran |
| 2007/0160435 A1 | 7/2007 | Chao |
| 2008/0166195 A1 | 7/2008 | Gentry et al. |
| 2008/0181738 A1 | 7/2008 | Capriotti et al. |
| 2008/0187405 A1 | 8/2008 | Nordlin |
| 2009/0035082 A1 | 2/2009 | Singh |
| 2009/0044674 A1 | 2/2009 | Neitzell |
| 2009/0216235 A1 | 8/2009 | Ellis |
| 2009/0222009 A1 | 9/2009 | Ellis |
| 2009/0279972 A1 | 11/2009 | Novak et al. |
| 2009/0326539 A1 | 12/2009 | Neumeyer et al. |
| 2010/0028098 A1 | 2/2010 | Shaffer |
| 2010/0034608 A1 | 2/2010 | Nordlin et al. |
| 2010/0080665 A1 | 4/2010 | Keightley |
| 2010/0086372 A1 | 4/2010 | Werner |
| 2010/0092256 A1 | 4/2010 | Khangar et al. |
| 2010/0145341 A1 | 6/2010 | Ranck et al. |
| 2010/0278601 A1 | 11/2010 | Beynon |
| 2010/0310332 A1 | 12/2010 | Serba |
| 2011/0038679 A1 | 2/2011 | Kozak |
| 2011/0052340 A1 | 3/2011 | Kozak |
| 2011/0073337 A1 | 3/2011 | Milbourne et al. |
| 2011/0170965 A1 | 7/2011 | Novak et al. |
| 2011/0170966 A1 | 7/2011 | Novak et al. |
| 2011/0170967 A1 | 7/2011 | Novak et al. |
| 2011/0170969 A1 | 7/2011 | Novak et al. |
| 2011/0170970 A1 | 7/2011 | Kalomeris et al. |
| 2011/0170971 A1 | 7/2011 | Novak et al. |
| 2011/0170972 A1 | 7/2011 | Zielonka et al. |
| 2012/0155979 A1 | 6/2012 | Khangar et al. |
| 2012/0247834 A1 | 10/2012 | Buxbaum et al. |
| 2014/0023446 A1 | 1/2014 | Piller et al. |
| 2014/0112728 A1 | 4/2014 | Baratta |
| 2014/0158569 A1 | 6/2014 | Green et al. |
| 2014/0271007 A1 | 9/2014 | Richter |
| 2015/0239051 A1 | 8/2015 | Novak et al. |
| 2016/0354846 A1* | 12/2016 | Heffernan ............ B26D 1/44 |
| 2017/0066064 A1 | 3/2017 | Novak et al. |
| 2017/0232530 A1 | 8/2017 | Novak et al. |
| 2018/0272441 A1 | 9/2018 | Novak et al. |

FOREIGN PATENT DOCUMENTS

| | | |
|---|---|---|
| CN | 203679357 U | 7/2014 |
| CN | 203696058 U | 7/2014 |
| DE | 2845123 | 4/1980 |
| DE | 3214209 | 10/1983 |
| DE | 9204681 | 8/1992 |
| DE | 29907717 | 8/1999 |

(56) References Cited

FOREIGN PATENT DOCUMENTS

| | | |
|---|---|---|
| DE | 20201300 | 7/2003 |
| DE | 20318529 | 4/2005 |
| DE | 102005012026 | 9/2006 |
| EP | 0612575 | 8/1994 |
| EP | 0792705 | 9/1997 |
| EP | 0965407 | 12/1999 |
| EP | 2070618 | 6/2009 |
| EP | 2987577 A1 | 2/2016 |
| EP | 3106254 | 12/2016 |
| GB | 911093 | 11/1962 |
| GB | 1476437 | 6/1977 |
| GB | 2040741 | 9/1980 |
| GB | 1589293 | 5/1981 |
| GB | 2338438 | 12/1999 |
| GB | 2451947 | 2/2009 |
| JP | S5689414 A | 7/1981 |
| JP | S5987338 A | 5/1984 |
| JP | S59131806 U | 9/1984 |
| JP | 4171108 | 6/1992 |
| JP | H0525013 | 4/1993 |
| JP | H07124809 A | 5/1995 |
| JP | 3019727 | 1/1996 |
| JP | 9192912 | 7/1997 |
| JP | 2003200415 | 7/2003 |
| JP | 2005-144568 | 6/2005 |
| JP | 2008018490 | 1/2008 |
| KR | 2012039417 | 4/2012 |
| NL | 9400753 | 12/1995 |
| WO | WO9015683 | 12/1990 |
| WO | WO9731743 A1 | 9/1997 |
| WO | WO0009284 | 2/2000 |
| WO | WO2008064409 | 6/2008 |
| WO | WO 2011/088268 | 7/2011 |
| WO | WO2011088269 | 7/2011 |

OTHER PUBLICATIONS

Inter Partes Review No. 2015-01461, "Petition for Inter Partes Review of U.S. Pat. No. 8,579,554", dated Jun. 22, 2015 (56 pages).
Inter Partes Review No. 2015-01461, "Petitioner Exhibit 1002 Declaration of James Pangerc", dated Jun. 22, 2015 (11 pages).
Makita Industrial Power Tools, 1998-1999 General Catalog (1998) ISO9002, p. 96.
Makita Industrial Power Tools, 2003-2004 General Catalog (2003) 2 pages.
International Search Report and Written Opinion for International Application No. PCT/US2019/041175, dated Oct. 24, 2019, 13 pages.
International Search Report and Written Opinion for International Application No. PCT/US2020/038167, dated Sep. 25, 2020, 14 pages.

* cited by examiner

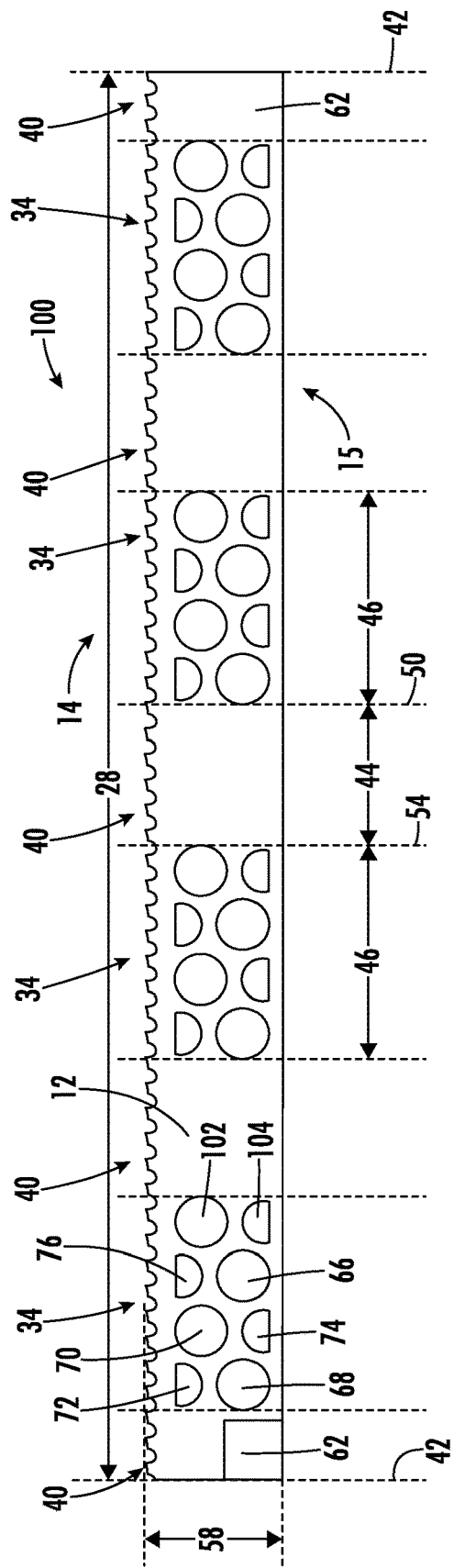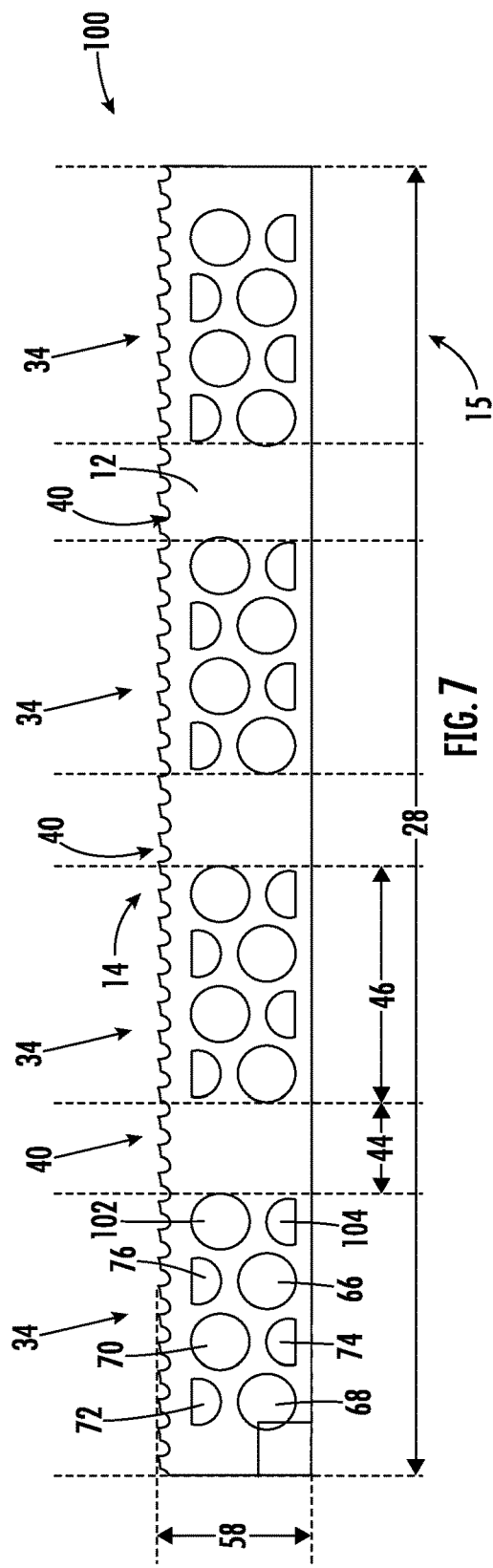

HOLE SAW WITH CIRCULAR SIDEWALL OPENINGS

CROSS-REFERENCE TO RELATED PATENT APPLICATION

The present application is a continuation of International Patent Application No. PCT/US2020/038167, filed Jun. 17, 2020, which claims the benefit of and priority to U.S. Provisional Patent Application No. 62/864,293, filed on Jun. 20, 2019, which are incorporated herein by reference in their entireties.

BACKGROUND OF THE INVENTION

The present invention generally relates to the field of tools. The present invention relates specifically to a hole saw having a plurality of circular sidewall openings. In general, a hole saw includes a cylindrical structure with cutting teeth at one end of the cylinder. In use, the hole saw spins at a high rate of speed, cutting a hole in a workpiece that has a size and shape that generally matches the size and shape of the cylindrical structure.

SUMMARY OF THE INVENTION

One embodiment of the disclosure relates to a hole saw including a body, such as a cylindrical saw body, and an endcap. The saw body includes a cutting edge at a first end of the saw body, and a second end of the saw body is coupled to an outer section of the endcap. The cylindrical saw body includes an outer surface and an inner surface defining a hollow internal area. The cylindrical saw body comprises a first group of circular openings extending between the outer surface and the inner surface, a second group of circular openings extending between the outer surface and the inner surface, and an uninterrupted area located between the first group of openings and the second group of openings.

According to an aspect, embodiments of the disclosure relate to a hole saw with an endcap and a sidewall. The sidewall defines a cutting edge at a first end and a second end opposite the cutting edge. The second end is coupled to the endcap. The sidewall includes a circular opening extending through the sidewall and a partial circular opening extending through the sidewall.

According to another aspect, embodiments of the disclosure relate to a hole saw with an endcap forming a base and configured to couple to an arbor and a cylindrical sidewall extending along a longitudinal axis and coupled to the endcap. The sidewall defines a cutting edge at a first end and a second end opposite the cutting edge. The second end is coupled to the endcap. The sidewall includes first and second groups of circular openings and a solid area. The first group of circular openings includes a circular opening and a partial circular opening that extend through the sidewall. The first group of circular openings defines a first longitudinal tangent line that is parallel to the longitudinal axis and tangential to one of the circular openings of the first group. Similarly, the second group of circular openings has a circular opening and a partial circular opening that extend through the sidewall. The second group of circular openings define a second longitudinal tangent line that is parallel to the longitudinal axis and tangential to one of the circular openings of the second group. The solid area is located between the first and second groups of circular openings and extends without openings in a circumferential direction between the first and second longitudinal tangent lines and in a longitudinal direction from the second end to the cutting edge.

According to still another aspect, embodiments of the disclosure relate to a hole saw with an endcap configured to couple to an arbor and a cylindrical sidewall coupled to the endcap. The sidewall defines a cutting edge at a first end and a second end opposite the cutting edge that is coupled to the endcap. The sidewall includes first and second groups of openings and a solid area. The first group of openings has a circular opening and a partial circular opening that both extend through the sidewall. The second group of openings has a circular opening and a partial circular opening that both extend through the sidewall. The solid area is located between the first and second groups of circular openings and defines a contiguous, unbroken section of material that extends without openings in a circumferential direction from the first group of openings to the second group of openings and in a longitudinal direction from the second end to the cutting edge.

In specific embodiments, the first group of openings includes a first opening and a second opening, and the second group of openings includes a first opening and a second opening. In specific embodiments, the first opening and second opening of the first group are spaced from each other in the circumferential direction such that the first opening is not located above the second opening in the longitudinal direction. In a specific embodiment, the first opening and second opening of the second group are spaced from each other in the circumferential direction such that the first opening is not located above the second opening in the longitudinal direction.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

FIG. 6 is a side plan view of one embodiment of a sidewall before shaping to the cylindrical structure, according to an exemplary embodiment.

FIG. 7 is a side plan view of one embodiment of a sidewall before shaping to the cylindrical structure, according to an exemplary embodiment.

DETAILED DESCRIPTION

Figure 1:
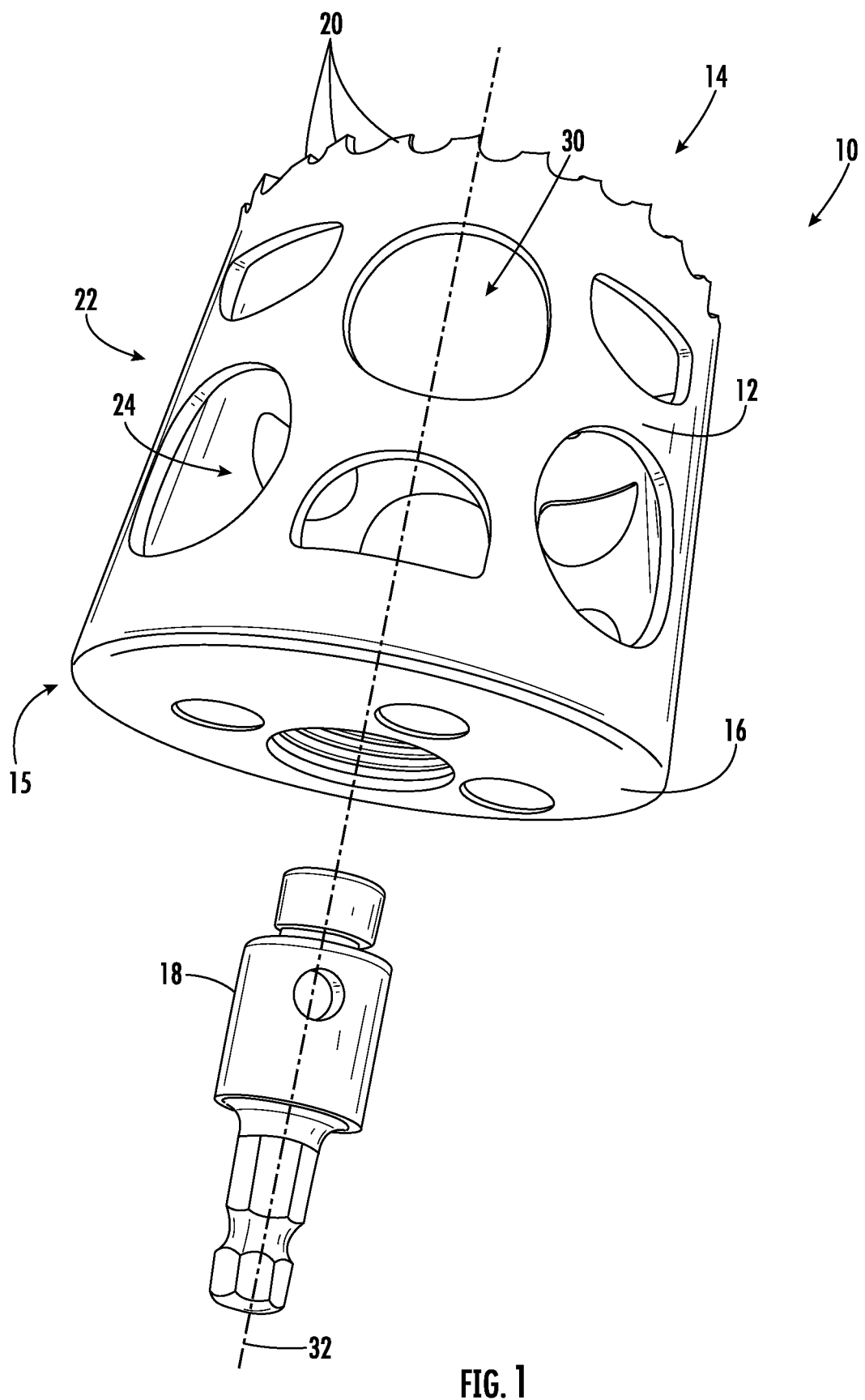
FIG. 1 is a perspective view of a hole saw and arbor, according to an exemplary embodiment.

Referring generally to the figures, various embodiments of a hole cutter or hole saw including a plurality of sidewall openings are shown. In general, a hole saw includes a cylindrical sidewall, a cutting end having cutting teeth at one end of the cylindrical sidewall and an endcap at the other end of the cylindrical sidewall. As will be generally understood, the endcap includes a mounting structure that mounts to a driving device (e.g., a power tool) that drives the hole saw in rotation to cut a hole in a workpiece. In various embodiments, the sidewall of the hole saw discussed herein includes a pattern of multiple sidewall openings strategically positioned and sized to provide improved functionality while still providing sufficient strength to the hole saw.

As will generally be understood, during the use of the hole saw, portions of cut materials (e.g., sawdust, chips, a plug of the material being cut, etc.) enter the central cavity of the hole saw. Some of this material eventually exits the hole saw through the sidewall holes by being ejected during the spinning of the hole saw. Other material is manually removed by pushing or prying the material out by insertion of a tool through the sidewall openings. In general and as will be discussed in more detail below, the circular sidewall openings are positioned in a pattern surrounding the entire circumference of the sidewall such that no matter what position the saw is in when it is spinning, one of the openings is easily accessible by the user for debris removal without further rotation of the saw blade. Further, the sidewall openings are relatively large, and numerous allowing the user to access the interior of the hole saw blade with a tool (e.g., a screwdriver) to dig or pry a plug/debris out from the hole saw center. In addition, Applicant believes that because the hole patterns shown herein increase ejection of debris during cutting, the ease of plug removal is improved because less sawdust and chips remain in the interior of the hole saw blocking plug removal.

While generally increasing the size and number of the sidewall holes of the hole saw blade increases ease of access for debris removal, the hole saw sidewall also provides strength and rigidity to the hole saw blade. The sidewall opening designs discussed herein strike a balance between strength and debris removal accessibility that Applicant believes provide higher levels of accessibility and strength than achieved with prior designs. Further, the sidewall opening pattern is arranged such that there are relatively large uninterrupted portions of the sidewall located between hole groupings which increase strength and also provide locations for weld seam location and placement of information (e.g., product information, logos, etc.). Further Applicant has found that circular shaped openings are easy to form in the metal workpiece that will form the sidewall as compared to other opening shapes. Further, circular opening are believed to further facilitate debris removal by eliminating sharp corners present in other hole pattern designs that may otherwise grip or catch debris during ejection or removal.

Referring to FIG. 1, a hole saw 10, is shown according to an exemplary embodiment. Hole saw 10 includes a cylindrical body formed from sidewall 12, a cutting end 14 at a first end of sidewall 12 and an endcap 16 coupled to the opposite, second end 15 of sidewall 12. In general, endcap 16 is a disc of metal material (e.g., a circular endcap 16) that may be coupled to sidewall 12 via a coupling structure such as a weld and/or a friction fit. In various embodiments, endcap 16 includes a central mounting portion or arbor 18 for coupling to a tool attachment structure. Circular endcap 16 forms a base that couples to arbor 18 to rotate hole saw 10. As will be generally understood, arbor 18 facilitates the coupling hole saw 10 to a driving device (e.g., an impact driver, power drill driver, etc.) which drives hole saw 10 during cutting.

As shown in FIG. 1, cutting end 14 includes a plurality of cutting teeth 20 that extend around cutting end 14. Teeth 20 may be formed in a wide variety of designs for different cutting applications. In specific embodiments, teeth 20 and cylindrical sidewall 12 are formed from a single, contiguous, continuous piece of metal material in which teeth 20 are formed.

Figure 2:
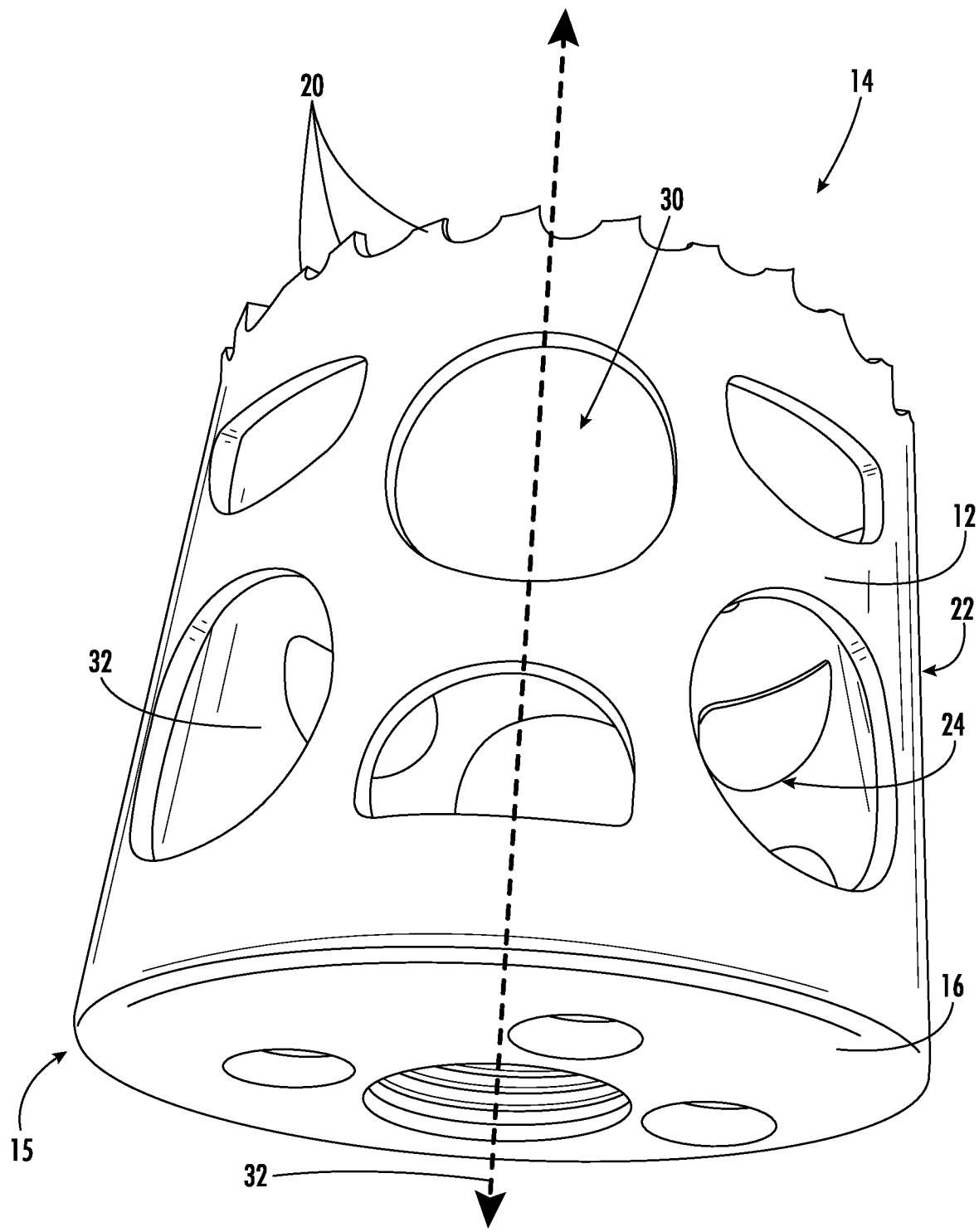
FIG. 2 is a perspective view from below of a hole saw, according to an exemplary embodiment.
Figure 3:
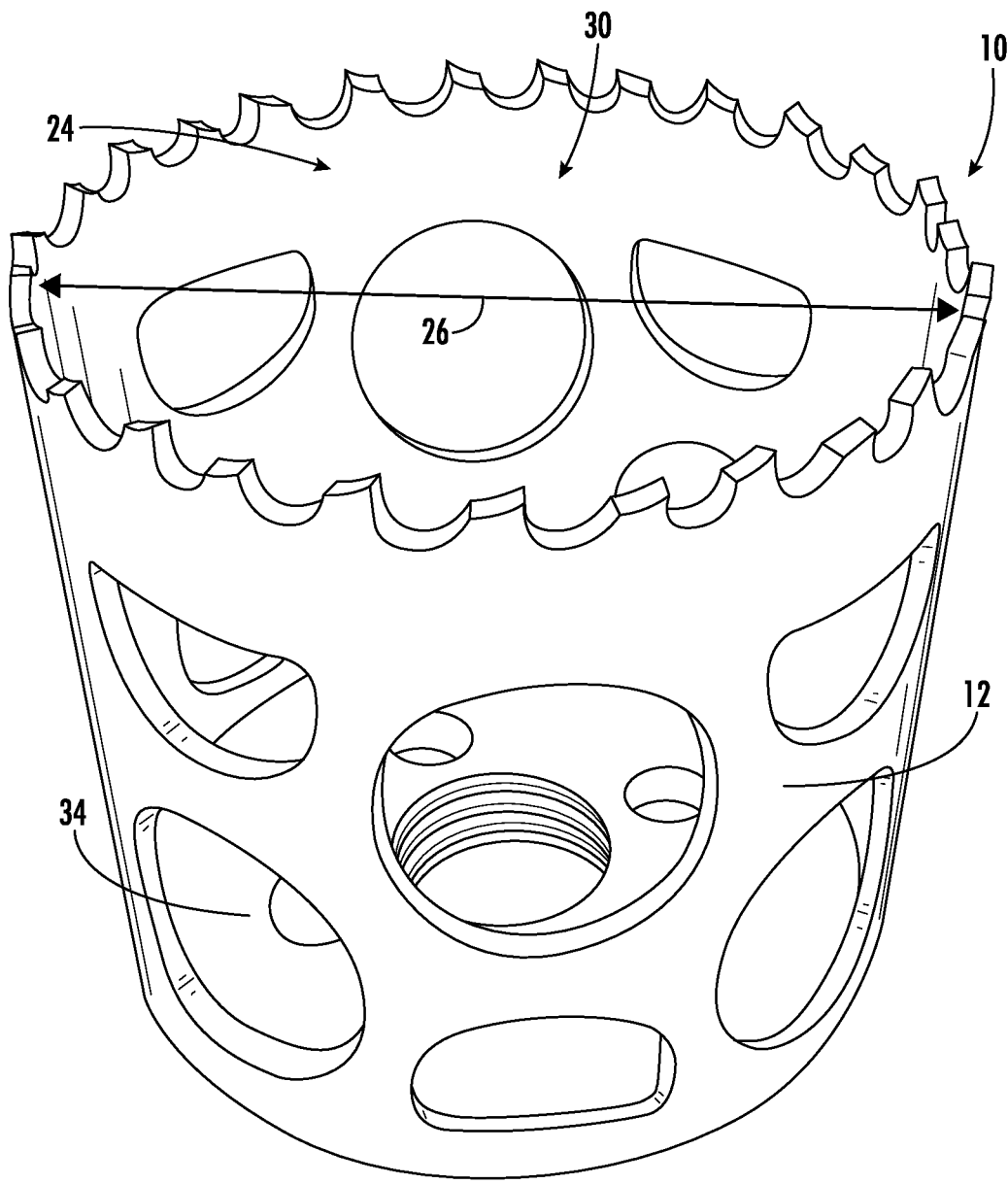
FIG. 3 is a perspective view from above of the hole saw of FIG. 2, according to an exemplary embodiment.

Referring to FIGS. 2-3, details of cylindrical sidewall 12 are shown and described. Cylindrical sidewall 12 is a cylindrical wall of material (e.g., metal material) that has an exterior surface 22 and an interior surface 24. When sidewall 12 is rolled into a cylindrical sidewall 12 hole saw 10 forms a diameter 26. Diameter 26 defines the size of hole saw 10.

For example, a hole saw 10 with a 6 inch diameter 26 is said to be a 6 inch hole saw 10 and will have a circumference 28 (e.g., the horizontal length of an unrolled sidewall 12) equal to pi (π) times the 6 inch diameter 26, specifically, the circumference 28 is 6 π inches or about 18.85 inches.

When sidewall 12 is formed (e.g., rolled) into a cylindrical body of hole saw 10, the cylindrical sidewall 12 is a substantially hollow cylinder such that a hollow internal area or interior 30 is defined by interior surface 24 of sidewall 12. A cutting edge is located at a first end of sidewall 12 and the second end 15 opposite the cutting edge couples to endcap 16 to form the cylindrical hole saw body. Hole saw 10 defines a longitudinal axis 32 that extends lengthwise through hole saw 10 (e.g., from the first end to the second end 15). Longitudinal axis 32 extends perpendicularly to endcap 16 and a plane defined by cutting end 14. Cylindrical sidewall 12 extends along the longitudinal axis 32 when it is coupled to endcap 16. As will be explained in more detail below, the pattern and geometry of a plurality of openings, or hole regions 34 in sidewall 12 provide for easy debris removal while also providing sidewall 12 sufficiently high strength and durability.

Figure 4:
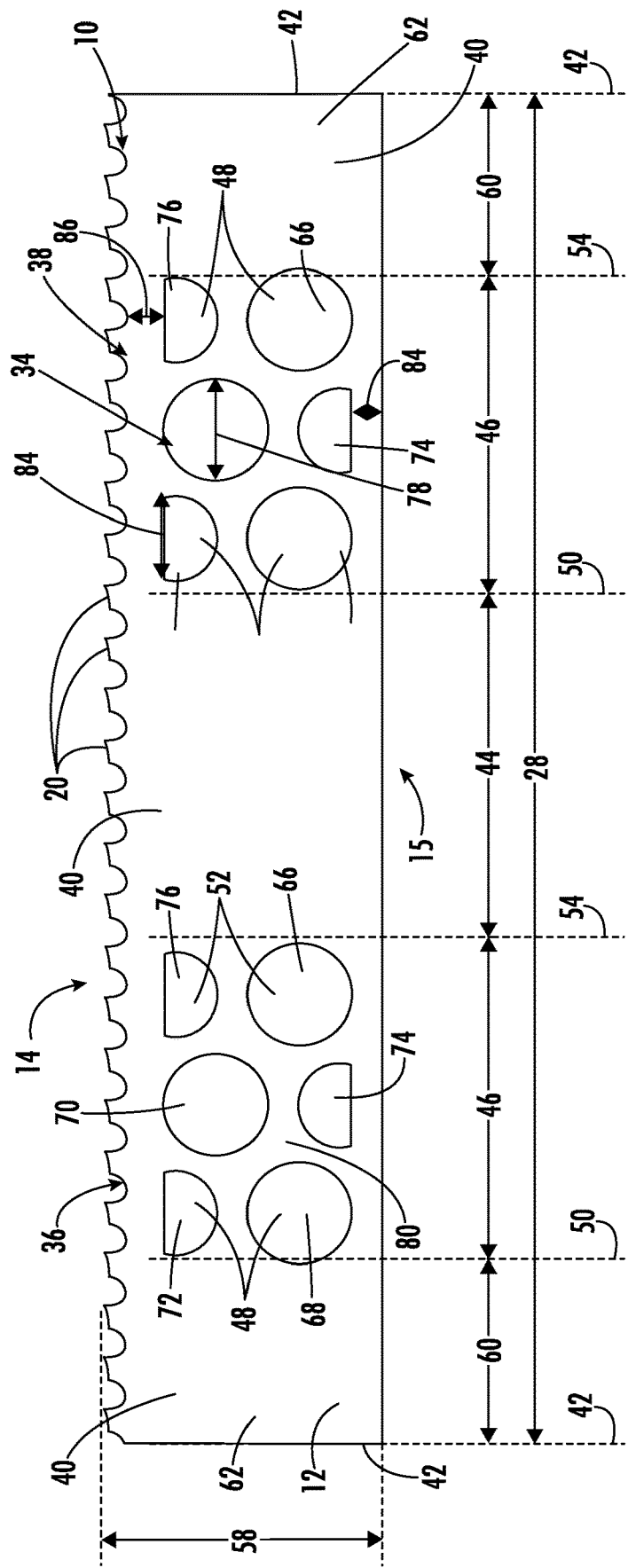
FIG. 4 is a side plan view of the sidewall of the hole saw of FIG. 2 before shaping to the cylindrical structure shown in FIG. 2, according to an exemplary embodiment.

FIG. 4 shows an unrolled sidewall 12 of hole saw 10, e.g., before the process of shaping the sidewall 12 into the cylindrical shape as shown in FIGS. 2 and 3. This view more clearly depicts the shape and pattern of openings in hole regions 34 along sidewall 12. As noted above, hole saw 10 includes hole regions 34 that are shaped and arranged in repeating patterns around the sidewall 12 of hole saw 10. In the embodiment of FIG. 4, hole regions 34 are arranged into a first opening group 36 and a second opening group 38 with a relatively large solid area or region 40 of uninterrupted portions of sidewall 12 located between opening groups 36 and 38. To form the cylindrical shape of hole saw 10, sidewall 12 is wrapped into a cylindrical shape (e.g., in a rolling process) and free edges 42 of sidewall 12 are welded together to form a seam in cylindrical sidewall 12; e.g., as shown in FIGS. 2 and 3, which are formed or rolled from the unrolled or flat sidewall 12 shown in FIG. 4. Sidewall 12 is also joined or welded to circular endcap 16. Solid region 40 may include a solid area that overlaps the seam joining two free edges 42 of sidewall 12 together to form sidewall 12 into a circular body. For example, solid region 40 includes the seam.

In general, large solid regions 40 and opening groups 36 and 38 are sized and positioned to provide a variety of functional benefits to hole saw 10. As shown in FIG. 4, opening groups 36 and 38 are evenly spaced circumferentially along sidewall 12 such that when formed to a cylindrical shape, sidewall 12 is substantially symmetrical. Similarly, the solid spaces are also positioned symmetrically around the circumference 28 to provide dynamic balancing. This position provides balance to hole saw 10, which is important to a rotary tool to limit/prevent shaking and vibration during use. Also, this positioning ensures that one of the opening groups 36 or 38 is generally facing the user regardless of the rotational position when hole saw 10 stops spinning, allowing the user easy access through an opening of hole region 34 into the interior 30 of sidewall 12 for debris removal. Solid regions 40 provide structural support and durability to the sidewall 12.

In general solid regions 40 are surrounded by opening groups 36 and 38 on either side of the solid region 40. For example, a first opening group 36 is on one side of solid region 40 and a second opening group 38 is located on the other side. First and second opening groups 36 and 38 are separated by solid region 40 in-between first and second opening groups 36 and 38. In various embodiments, the first and/or second opening groups 36 and/or 38 each have one or more circular openings 66 and/or partial circular opening 72. In a specific embodiment, the first and/or second opening groups 36 each have three or more circular openings 66 and three or more partial circular openings 72.

Still referring to FIG. 4, uninterrupted solid regions 40 have a circumferential length or width 44, and each opening group 36 and 38 has a circumferential length or width 46. The width 44 of solid region 40 extends from the end of one opening group 36 and extends to an opposite end of another opening group 38. Specifically, one end of opening groups 36 and 38 includes a first set of holes 48 that define a first longitudinal tangent line 50 tangent to the first set of holes 48. A second end of opening groups 36 and 38 includes a second set of holes 52 that define a second longitudinal tangent line 54 tangent to the second set of holes 52. The first and second longitudinal tangent lines 50 and 54 are parallel to the longitudinal axis 32 and tangent to the holes 52 on a boundary of the hole region 34 and/or opening groups 36 and 38.

The width 44 of solid region 40 is defined as the perpendicular distance across the solid region 40 between second tangent line 54 and first tangent line 50. The width 44 of hole region 34 is the perpendicular distance across the hole region 34 between the first tangent line 50 and the second tangent line 54 on the same hole region 34 (e.g., across opening group 36 or opening group 38). Solid region 40 extends without openings 66 and/or 72 along sidewall 12. Solid region 40 is located between first and second groups of openings 36 and 38 that have circular and/or partial circular openings 66 and/or 72, (e.g., between first and second tangent lines 50 and 54). For example, solid region 40 extends between two groups of circular openings 36 and 38 without any openings or holes in a circumferential direction (e.g., along circumference 28) between first and second longitudinal tangent lines 50 and 54. Solid region 40 extends in a longitudinal direction (e.g., height 58) from cutting end 14 to second end 15 of sidewall 12.

A height 58 of sidewall 12 is defined as the distance between a top of cutting end 14 and a bottom of sidewall 12 (e.g., the top of endcap 16). As shown in FIG. 4, height 58 is constant along the circumference 28 of sidewall 12, and thus the ratio of the width 44 of solid region 40 to the circumference 28 is proportional to the ratio of the area of solid region 40 to the total sidewall 12 area. Similarly, the width 46 of opening group 36 is added to the width 46 of opening group 38 to determine the ratio of the total width 46 of hole regions 34 to circumference 28. As used herein, the ratio of solid regions 40 (and/or hole regions 34) to circumference 28 is proportional (e.g., equal) to the ratios of the relative areas. However, it is to be understood that similar area ratios may be used when the height 58 of sidewall 12 is not constant.

As will be understood, the absolute value of solid region width 44 and hole region 34 width 46 (e.g., opening group 36 or 38) will vary based on the diameter 26 of a particular hole saw 10 and on the number of opening groups 36 and 38 located around sidewall 12. In addition, a total solid region width 44 represents the sum of all solid region widths 44 about the circumference of sidewall 12. Also, hole saw 10 may include more than two opening groups 36 and 38 and/or include opening groups 36 and 38 with different numbers of holes as needed for different sized hole saws 10. For example, a first opening group 36 has different sized circular openings 66 and/or partial circular openings 72 than a second opening group 38. Similarly, the total hole region 34 width 46 represents the sum of all hole regions 34 located around the circumference of sidewall 12.

In specific embodiments, width 44 of the solid region 40 and width 46 of opening groups 36 and/or 38 are substantially equal to each other, and specifically are within 50%, more specifically within 30%, and even more specifically within 20% of each other. This applies to individual solid region 40 width 44 to opening groups 36 and 38 width 46 and to total solid region width 44 and total open region width 46. Applicant has found that this relative sizing between uninterrupted solid regions 40 and opening groups 36 and 38 provides balance, sufficient strength, and easy debris removal access to interior 30. Further, this relative sizing ensures that uninterrupted solid regions 40 are also large enough to provide areas to place logos or product information.

A ratio relates the area of solid regions 40 to the total sidewall area. For example, the width 44 and number of solid regions 40 are calculated. The total width of the solid regions 40 includes the width 60 of the two partial solid regions 62 on either side of the sidewall 12, e.g., at either end. For example, in the embodiment of FIG. 4, the rolled cylindrical sidewall 12 includes two solid regions 40; the central solid region 40 and a second solid region 40 formed by joining the two partial solid regions 62, each with a partial width 60. In some embodiments, the two partial widths 60 add to the width 44 of a single solid region 40. The width 44 of each solid region 40 is added, and the sum is compared to circumference 28 to define a ratio of solid regions 40 to circumference 28 (or an area of solid regions 40 to total sidewall 12 area). In some embodiments, the ratio of solid regions 40 to circumference 28 of the sidewall 12 is between 20% and 65% and more specifically between 25% and 60%.

In various embodiments, each hole region 34 (e.g., opening groups 36 and 38) includes a plurality of openings distributed both in the circumferential/width direction (e.g., along the circumference 28) and in the longitudinal direction (e.g., along the height 58). In general, Applicant has found that hole region 34 arrangements that include multiple openings within each opening group 36 and 38 provide sufficient access to interior 30 for debris removal while also ensuring adequate metal material is located within sidewall 12 (including in hole regions 34) to provide structural support to hole saw 10. In addition to debris removal, in at least some of the embodiments discussed herein, hole saw 10 includes two or more opening groups 36 and 38 that extend around at least 50%, specifically at least 60%, and more specifically at least 70% of the circumference 28 of sidewall 12. In other words, in such arrangements, the sum of widths 46 for all opening groups 36 and 38 is greater than 50% of the circumference 28; specifically greater than 60%, and more specifically greater than 70% of circumference 28. Such hole regions 34 or patterns facilitate chip ejection around at least 50% of the circumference 28 of sidewall 12. Because chips are developed all around the circumference 28 of hole saw 10 during cutting, hole regions 34 provide areas for chip ejection around a significant portion of the circumference 28, which is believed to improve hole saw 10 performance. In a specific embodiment, the width 44 of a solid region 40 along a perimeter of the second end 15 of sidewall 12 is at least 50% of a width of a hole region 34 that has openings 66 and/or 72 along the same perimeter.

In the specific embodiment shown in FIG. 4, each opening group 36 and 38 include three complete openings (e.g., opening 66, opening 68, and opening 70) and three partial openings (e.g., opening 72, opening 74, and opening 76). In general, reference to complete opening 66 and/or partial opening 72, should be understood to apply to all complete openings (e.g., opening 66 applies to opening 68 and opening 70) and/or partial openings (e.g., opening 72 applies to opening 74 and opening 76) unless otherwise specifically indicated.

In the particular arrangement of FIG. 4, openings 66, 68, and 70 have the same hole diameter 78. Opening 70 is located closer to cutting teeth 20 than openings 66 and 68. Partial openings 72, 74, and 76 have the same or similar shapes to each other, each forming partial circular openings (e.g., semi-circles or half-circles). In some embodiments, partial openings 72, 74, and/or 76 form more or less circular openings than a half-circle. Partial openings 72 and 76 are located closer to teeth 20 than partial opening 74.

As used herein, partial openings 72, 74, and/or 76 can be semicircular. A partial opening 72, 74, or 76 can include a segment of a circular (e.g., a circular segment opening) where the segment is a part of a circle that is enclosed by an arc with a chord extending in a straight line from one end of the arc to the opposite end. A circular segment of partial opening 72, 74, and/or 76 may be a hemisphere, and/or a major or minor segment of a circle. As used herein a hemisphere, or semicircle, is a circular segment where the chord is equal to a diameter of the circle. A major segment includes the hemisphere or any chord where the circular segment is greater than the hemisphere. For example, a major segment opening would have a partial opening 72 that is equal to or larger than the hemisphere opening. A minor segment includes the hemisphere and/or any chord where the circular segment is less than the same diameter hemisphere. For example, a minor segment opening would have a partial opening 72 that is equal to or less than the same diameter hemisphere.

Circular and/or partial circular openings 66 and/or 72 extend through the sidewall 12. In general circular openings 66 and/or partial openings 72 can be different sizes/diameters. For example, a first circular opening 66 has a first diameter and a second circular opening 68 has a second diameter that is larger than the diameter of circular opening 66. Similarly, a first partial circular opening 72 may have a different diameter, chord, and/or arch-length than a second partial circular opening 74. In some embodiments, circular openings 66 have different diameters than partial circular openings 72 within the same opening group. For example, circular opening 66 and/or partial circular openings 72 are located in opening group 36 and the circular openings 66 in opening group 36 have different sizes/diameters than the partial circular openings 72. In a specific embodiment, circular openings 66 have equal diameters and partial circular openings 72 in first and second opening groups 36 and 38 have equal diameters. In variations of this embodiment, the diameter of the circular openings 66 is equal to, greater than, or less than the diameter of the partial openings 72.

Openings 66 and 68 are offset from each other along the circumference 28 (e.g., in the circumferential/width direction) such that an uninterrupted portion 80 of sidewall 12 is located in the width direction between openings 66 and 68. In this arrangement, no portion of opening 66 is located between opening 68 and the cutting teeth 20 in the longitudinal direction. For example, the first circular opening 66 and the second opening 68 have different diameters and are spaced from each other in the circumferential direction of sidewall 12. In this embodiment, first circular opening 66 is not located above second circular opening 68 in a longitudinal direction of sidewall 12. A similar arraignment is contemplated for partial circular openings 72 and 74, such that partial opening 72 is not located above partial opening 74 in a longitudinal direction of sidewall 12.

In the specific embodiment shown in FIG. 4, openings 66, 68, and 70 are circular in shape. Openings 66, 68, and 70 are larger than partial openings 72, 74, and 76. Applicant has found that by providing a pattern of openings of various shapes and locations enhances debris removal due to the access to interior 30. In alternative embodiments, opening groups 36 and 38 do not include the smaller partial openings 72, 74, and 76, and only include openings 66, 68, and/or 70.

Specifically, within each opening group 36 and 38, Applicant has determined that a ratio of open area to solid area (e.g., solid region 40) relates to the balance between debris removal and strength. In specific embodiments, the total area of opening groups 36 and 38 is determined by width 46 of opening groups 36 and/or 38 times the vertical length, or height 58 of sidewall 12, where width 46 is the circumferential length or width measured between widest lateral edges of openings within the group. Because height 58 is continuous along sidewall 12, the ratio of the sum of the width 46 of hole regions 34 or width 44 of solid regions 40 to the circumference 28 is the same as the ratio of the area of the hole regions 34 or solid regions 40 to the total area of sidewall 12. In various embodiments, the ratio of the width 46 of opening groups 36 and 38 to the total circumference 28 is between 30% and 80% and more specifically is between 40% and 75%.

In addition to the shape and distribution within each opening group 36 and 38, openings 66, 68, and 70 and/or partial openings 72, 74, and 76 are sized and shaped to allow for easy insertion of a tool (e.g., a screwdriver) through the openings to facilitate removing or prying of a plug or other cutting debris from interior 30. Thus, the upper and lower edges of partial openings 72, 74, and/or 76 having a circumferential length or width, 82, that is large enough to permit insertion of a standard flat head screwdriver. In some embodiments, openings 66, 68, and 70 are have a hole diameter 78 that is greater than a perimeter width 82 of partial opening 72, 74, and/or 76. In a specific embodiment, hole diameter 78 is between 0.25 inches and 0.5 inches.

In various embodiments, opening groups 36 and 38 are positioned relative to cutting teeth 20 and endcap 16 to improve hole saw 10 performance. For example, the lowest edge of the lowest hole of each hole group is spaced a short distance 84 from the weld joining endcap 16 to sidewall 12. For example, distance 84 is a small distance to allow insertion of a tool behind debris located adjacent endcap 16 within hole saw 10 to facilitate debris removal. In specific embodiments, distance 84 is between $1/16^{th}$ of an inch and $1/2$ inch, specifically between $1/8^{th}$ of an inch and $1/4^{th}$ of an inch, and more specifically between $5/32^{nd}$ and $7/32^{nd}$ of an inch.

As another example, the highest edge of the highest hole of each hole group is spaced a distance 86 from the valley or gullet between adjacent cutting teeth 20. In general, Applicant has determined that if distance 86 is too small, cutting teeth 20 can be damaged or experience high wear during use and/or an undesirable degree of heat can be built up at the cutting edge of the hole saw 10. In various embodiments, distance 86 is between $1/16^{th}$ of an inch and 1 inch, specifically between $1/8^{th}$ inch and $3/8^{th}$ of an inch, and more specifically between $3/16^{th}$ and $5/16^{th}$ of an inch.

Figure 5:
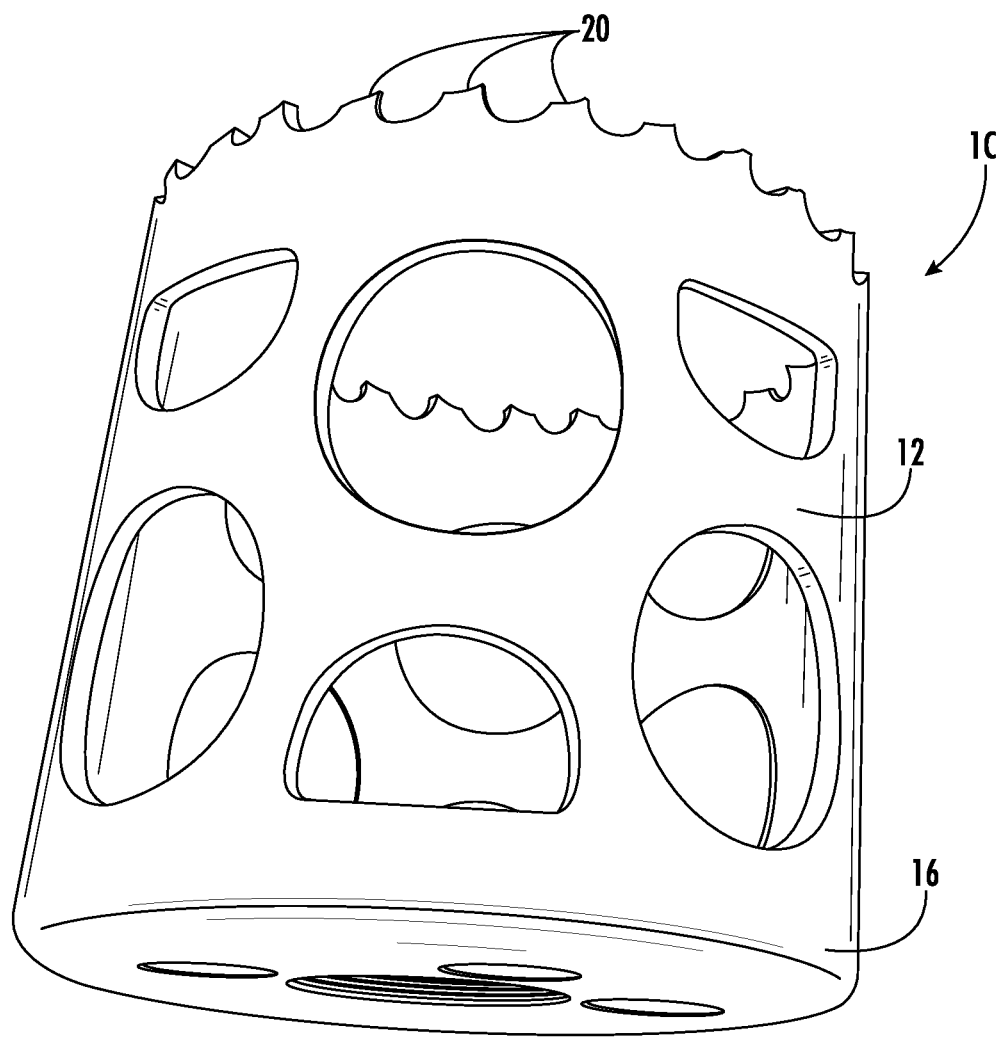
FIG. 5 is a perspective view of a hole saw showing the sidewall rolled into a cylindrical structure, according to another exemplary embodiment.

FIG. 5 illustrates a bottom perspective view of hole saw 10 with a sidewall 12 rolled into a cylindrical body, according to an exemplary embodiment. FIG. 5 illustrates a view of hole saw 10 when sidewall 12 is rolled to form the cylindrical body. Diameter 26 is commonly used to define the size of a hole saw 100. For example, a 2-inch hole saw 100 would have a diameter 26 of 2 inches and a circumference 28 (FIG. 4) of 2 π inches (approximately 6.28 inches).

Figure 10:
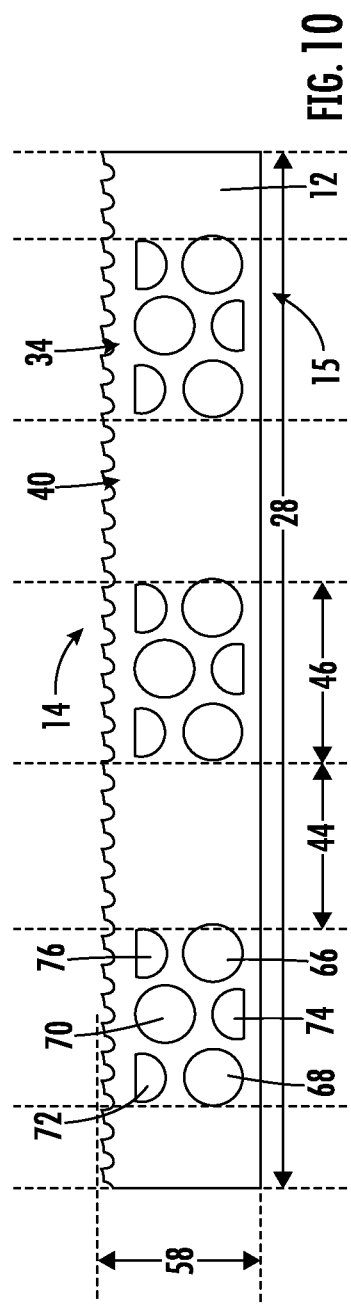
FIG. 10 is a side plan view of one embodiment of a sidewall before shaping to the cylindrical structure, according to an exemplary embodiment.
Figure 11:
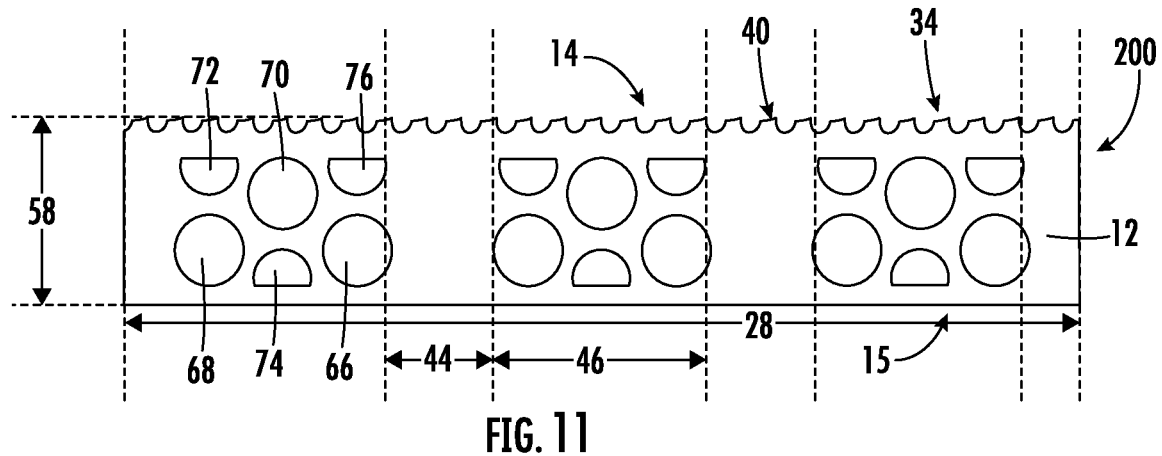
FIG. 11 is a side plan view of one embodiment of a sidewall before shaping to the cylindrical structure, according to an exemplary embodiment.
Figure 16:
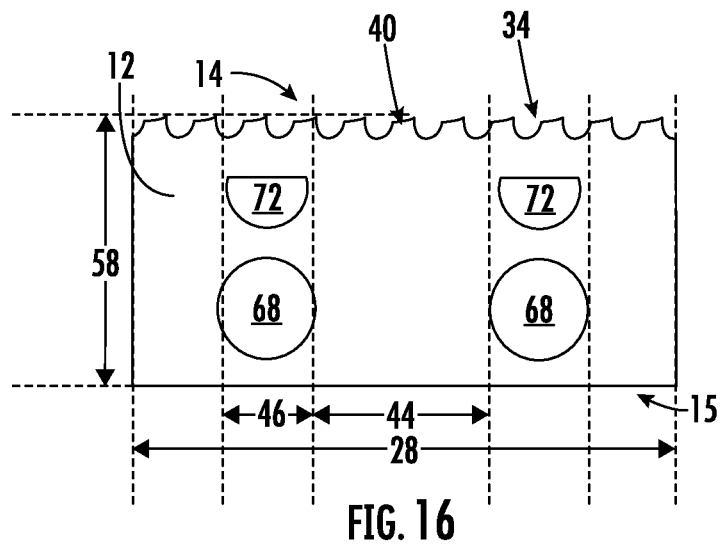
FIG. 16 is a side plan view of one embodiment of a sidewall before shaping to the cylindrical structure, according to an exemplary embodiment.
Figure 17:
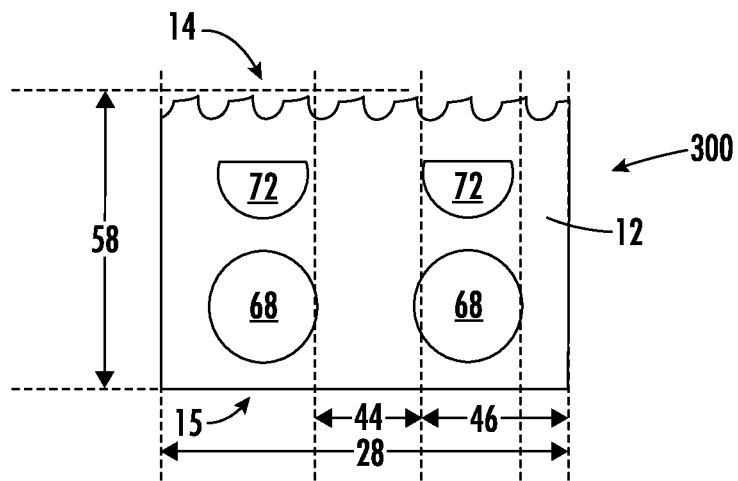
FIG. 17 is a side plan view of one embodiment of a sidewall before shaping to the cylindrical structure, according to an exemplary embodiment.
Figure 18:
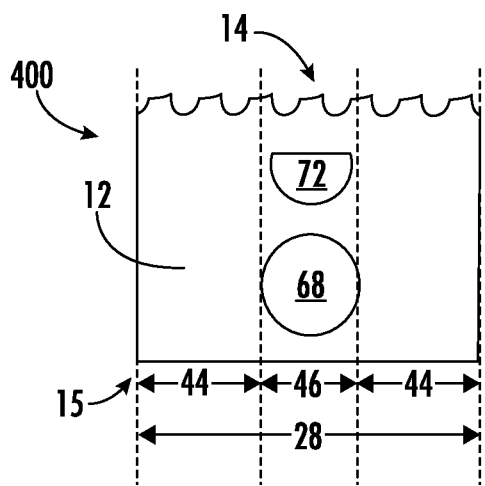
FIG. 18 is a side plan view of one embodiment of a sidewall before shaping to the cylindrical structure, according to an exemplary embodiment.
Figure 19:
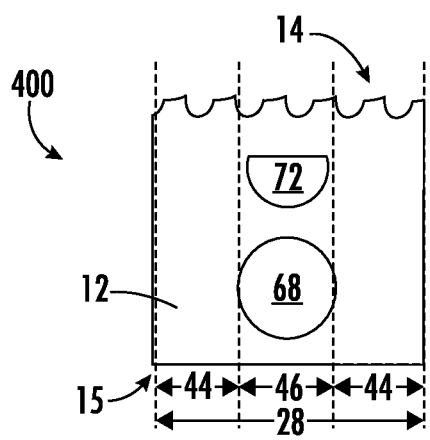
FIG. 19 is a side plan view of one embodiment of a sidewall before shaping to the cylindrical structure, according to an exemplary embodiment.

Referring generally to FIGS. 6-19, various embodiments of a planar sidewall 12 of different sizes/hole saw diameters 26 are shown before the formation of the cylindrical body structure (e.g., rolling planar sidewall 12 into a cylindrical sidewall 12). In general, sidewall 12 includes two or more different regions: hole regions 34 and solid regions 40. Hole regions 34 are interspersed between solid regions 40. In some embodiments, repeating patterns of hole regions 34 and solid regions 40 are formed along the length or circumference 28 of sidewall 12. For example, FIGS. 6-9 illustrate sidewall 12 embodiments with four hole regions 34 and four solid regions 40. The fourth solid region 40 is formed by rolling sidewall 12 into a cylinder. The two partial solid regions 62 on either end of sidewall 12 are joined. Similarly, FIGS. 10-11 show sidewalls 12 with three solid regions 40 and three-hole regions 34. FIGS. 12-17 illustrate sidewalls 12 with two solid regions 40 and two hole regions 34. FIGS. 18-19 illustrate sidewalls 12 with one solid region 40 and one hole region 34.

Applicant has found that interspersing hole regions 34 with solid regions 40 enhances accessibility to interior 30 and reduces materials and weight while maintaining adequate strength and durability of sidewall 12. Applicant has found that a ratio of the summed width 44 of all solid regions 40 to the circumference 28 of sidewall 12 should be between 24% and 65%.

FIGS. 6-9 show various embodiments of a four solid region 40 hole saw 100. Hole saw 100 is substantially the same as hole saw 10 except for the differences discussed herein. In general, hole saw 100 includes four open groups or hole regions 34 and four solid regions 40. In this way, hole saw 100 includes more hole regions 34 and/or more openings within each group than hole saw 10. In specific embodiments, hole saw 100 has a larger diameter 26 than hole saw 10 with the increased number of holes accounting for the larger size. Applicant has found that the ratio of the area of the four solid regions 40 (e.g., the sum of the widths 44) should be between 20% and 50% of the sidewall 12 total area (e.g., circumference 28) for hole saw 100, specifically, between 25% and 45% of the total sidewall 12 area. As illustrated, FIGS. 6-9 have different widths 44 of solid region 40 used with different diameter 26 hole saws 100, this results in different ratios for the solid region 40 to total sidewall area.

FIG. 6 shows one embodiment of a four solid region 40 hole saw 100. Hole saw 100 has a diameter 26 between 2 inches and 8 inches. In a specific embodiment illustrated in FIG. 6, hole saw 100 has a diameter 26 between 5 inches and 7 inches. Solid region 40 has a width 44 between 1.5 inches and 2 inches, specifically between 1.7 inches and 1.9 inches. For example, a 6 inch diameter 26 hole saw 100 (e.g., with a circumference 28 equal to 6 π, approximately 18.85 inches), has four hole regions 34 and four solid regions 40. In this configuration, the width 44 of each solid region 40 is 1.837 inches.

As illustrated in FIG. 6, hole saw 100 includes an additional complete opening 102 and a partial opening 104. For example, there are four hole regions 34 and each hole region 34 includes a total of four complete openings 66, 68, 70, and 102 and four partial openings 72, 74, 76, and 104. Hole region 34 of FIG. 6 may include additional openings. In some embodiments, the hole diameters 78 (FIG. 4) of hole region 34 also vary with hole saw 100 sizes (e.g., based on a ratio of the circumference 28 to the hole regions 34). In such a way, hole saw 100 with four hole regions 34 may include additional complete openings 102 and/or partial openings 104 (as shown in FIGS. 6 and 7) and/or may include openings with different hole diameters 78. For the hole saw 100 illustrated in FIG. 6, a ratio of solid regions 40 to the total area of sidewall 12 (e.g., width 44 to total circumference 28) is between 30% and 45%, and specifically between 35% and 40%. In the example above, a 6-inch diameter 26 hole saw 100 with four solid regions 40 has a width 44 of 1.837 inches and a solid region 40 to total area ratio of approximately 39%.

With reference to FIGS. 6 and 7, hole saw 100 includes four hole regions 34 adjacent to four solid regions 40. Each hole region 34 is separated from an adjacent hole region 34 via an uninterrupted solid region 40. Solid regions 40 and/or hole regions 34 are substantially evenly spaced such that one group is located within each 90-degree section around the circumference 28 of hole saw 100.

As shown in FIGS. 6 and 7, the width 44 of solid region 40 and/or the width 46 of hole regions 34 varies with the size of hole saw 100 and/or circumference 28. For example, the four solid region 40 hole saw 100 of FIG. 7 has a diameter 26 between 4 inches and 6 inches and a width 44 between 0.8 inches and 1.2 inches. In a specific embodiment, hole saw 100 of FIG. 7 has a 5-inch diameter 26, or a 5 π inch circumference 28 approximately equal to 15.7 inches and a width of solid region of 1.054 inches. Solid region 40 has a width 44 between 0.8 inches and 1.2 inches, specifically between 0.9 inches and 1.1 inches. Applicant has found that for the hole saw 100 illustrated in FIG. 7, a ratio of solid regions 40 to the total area of sidewall 12 body should be between 20% and 35%, specifically, between 25% and 30%, and more specifically between 26% and 28%. In the example above, a 5-inch diameter 26 hole saw 100 with four solid regions 40 having a width 44 of 1.054 inches may have a solid region 40 area to total area ratio of approximately 26.8%.

Figure 8:
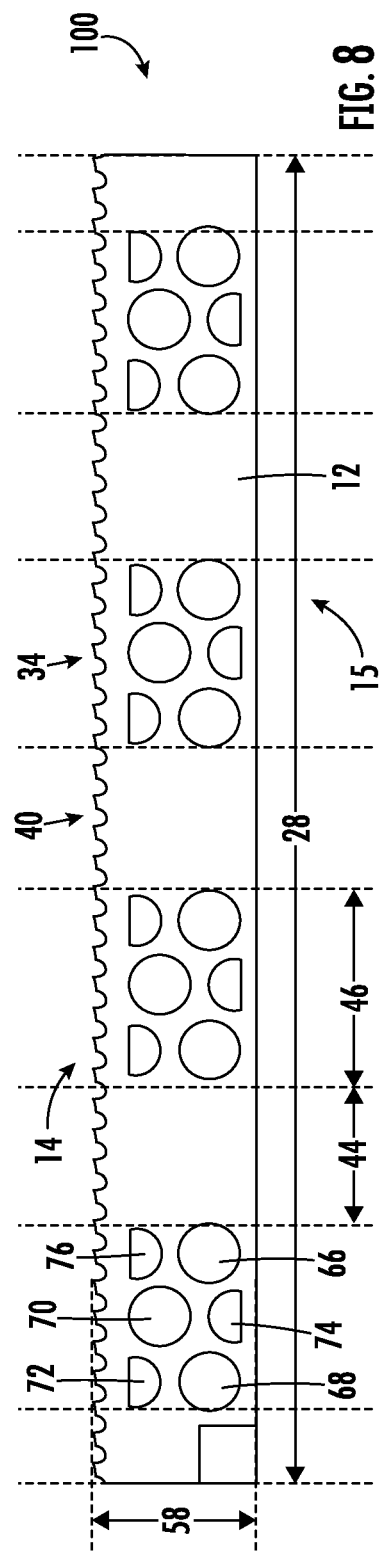
FIG. 8 is a side plan view of one embodiment of a sidewall before shaping to the cylindrical structure, according to an exemplary embodiment.
Figure 9:
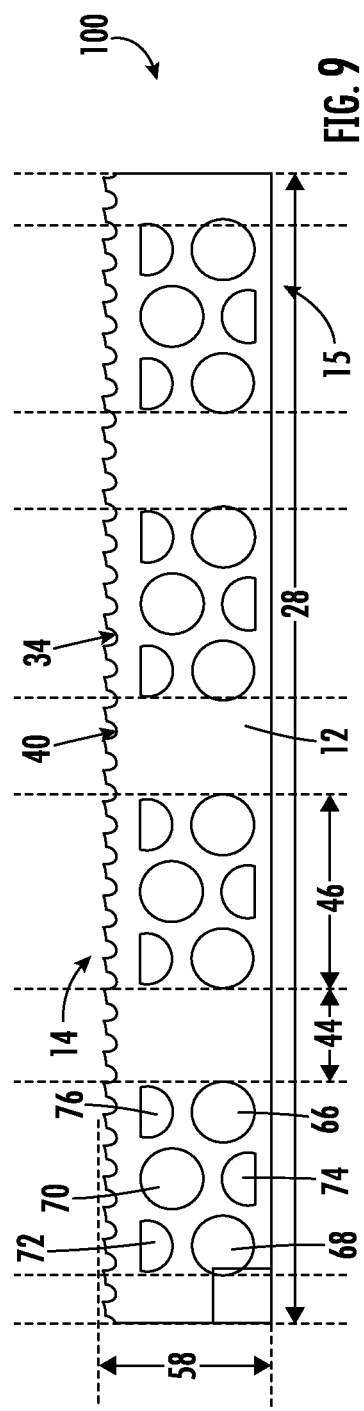
FIG. 9 is a side plan view of one embodiment of a sidewall before shaping to the cylindrical structure, according to an exemplary embodiment.

FIGS. 8 and 9 illustrate hole saw 100 with four solid regions 40 with the additional complete opening 102 and partial opening 104 removed. The hole saw 100 illustrated in FIGS. 8 and 9 has a diameter 26 between 3 inches and 5 inches (e.g., a circumference 28 between 3 π inches (~9.4 inches) and 5 π (~15.7 inches)). Width 44 of each solid region 40 may be between 1 inch and 2 inches, specifically between 1.25 inches and 1.75 inches. In a specific embodiment illustrated in FIG. 8, hole saw 100 has a diameter 26 of 4¾ inches and four solid regions 40 with a width 44 of 1.567 inches. In this configuration, hole saw 100 has a ratio of solid region 40 to total area of between 40% and 45%, specifically about 42%.

In a specific embodiment of FIG. 9, hole saw 100 has a diameter 26 of 4 inches and four solid regions 40 each with a width 44 of 0.982 inches. In this configuration, hole saw 100 has a ratio of the total solid regions 40 to the total area of about 31.25%.

FIGS. 10-11 show various embodiments of a hole saw 200, according to exemplary embodiments. Hole saw 200 is substantially the same as hole saw 10 and 100 except for the differences discussed herein. In general, hole saw 200 includes three hole regions 34 and three solid regions 40. In this way, hole saw 200 includes fewer hole regions 34 and/or openings within each group than hole saw 100. In specific embodiments, hole saw 200 has a smaller diameter 26 than hole saw 100 with fewer holes accounting for the smaller size. Applicant has found that the ratio of the area of the three solid regions 40 (e.g., the sum of the widths 44) should be between 25% and 50% of the total area of sidewall 12 (e.g., circumference 28) for hole saw 100, specifically, between 30% and 46.2% of the total sidewall 12 area. Solid regions 40 and/or hole regions 34 are substantially evenly spaced such that one group is located within each 120-degree section around the circumference 28 of hole saw 200.

As illustrated, FIGS. 10-11 have different widths 44 of solid region 40 used with different diameter 26 hole saws 200, this results in different ratios for the solid region 40 to total sidewall area. Hole saw 200 can include diameters 26 between 2.5 inches to four inches. Referring to FIG. 10, hole saw 200 has a diameter 26 between 3.5 inches and 4 inches and have three solid regions 40, each with a width 44 between 1.5 inches and 2 inches. A ratio of the solid regions 40 to the total area is between 40% and 50%, specifically between 44% and 48%. In a specific embodiment of FIG. 10, hole saw 200 has a diameter 26 of 3.875 inches, three solid regions 40, each with a width 44 of approximately 1.874 inches, and a ratio of solid regions 40 to the total sidewall 12 area of approximately 46.2%.

FIG. 11 shows a hole saw 200 with a diameter 26 between 2.5 inches and 3.5 inches with three solid regions 40, each with a width 44 between 0.7 inches and 1.1 inches. A ratio of the solid regions 40 to the total area is between 25% and 35%, specifically between 28% and 32%. In a specific embodiment of FIG. 11, hole saw 200 has a diameter 26 of 3 inches, three solid regions 40, each with a width 44 of approximately 0.961 inches, and a ratio of the area of the solid regions 40 to the total area of approximately 30.6%.

FIGS. 12-17 show various embodiments of a hole saw 300, according to exemplary embodiments. Hole saw 300 is substantially the same as hole saws 10, 100, and 200 except for the differences discussed herein. In general, hole saw 300 includes two hole regions 34 and two solid regions 40. In this way, hole saw 300 has fewer opening groups and/or openings within each group than hole saws 100 and 200. In specific embodiments, hole saw 300 has a smaller diameter 26 than hole saws 100 and 200 with fewer holes accounting for the smaller size. Applicant has found that the ratio of the area of the two solid regions 40 (e.g., the sum of the widths 44) should be between 35% and 75% of the total area of sidewall 12 (e.g., circumference 28) for hole saw 100, specifically, between 40% and 73% of the total sidewall 12 area.

Figure 12:
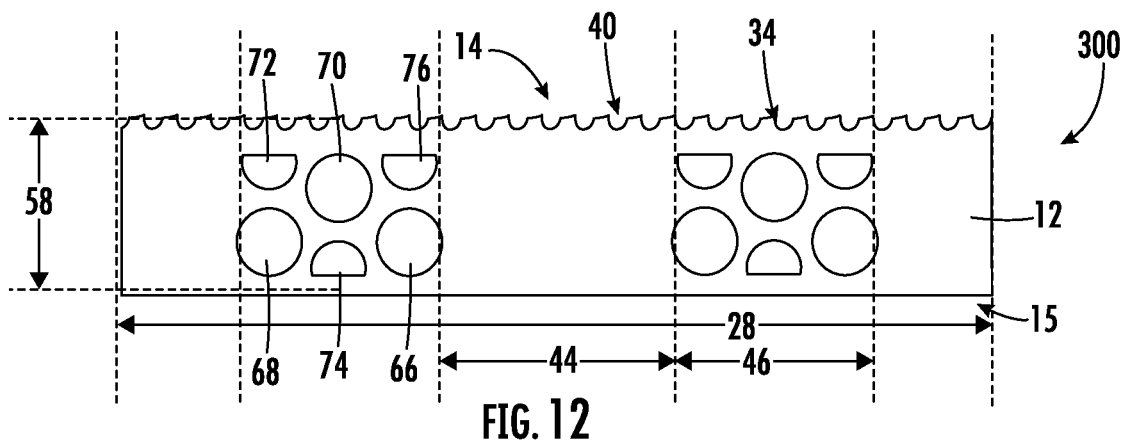
FIG. 12 is a side plan view of one embodiment of a sidewall before shaping to the cylindrical structure, according to an exemplary embodiment.
Figure 13:
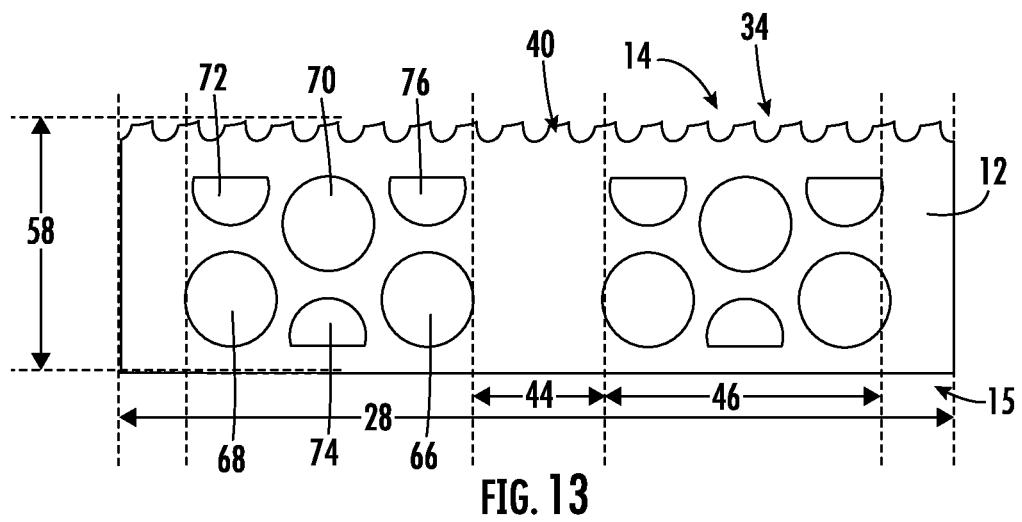
FIG. 13 is a side plan view of one embodiment of a sidewall before shaping to the cylindrical structure, according to an exemplary embodiment.
Figure 14:
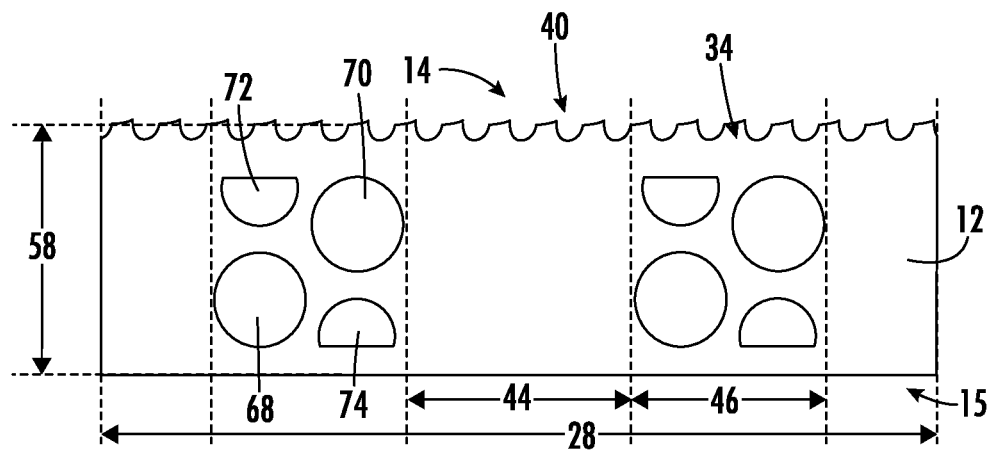
FIG. 14 is a side plan view of one embodiment of a sidewall before shaping to the cylindrical structure, according to an exemplary embodiment.
Figure 15:
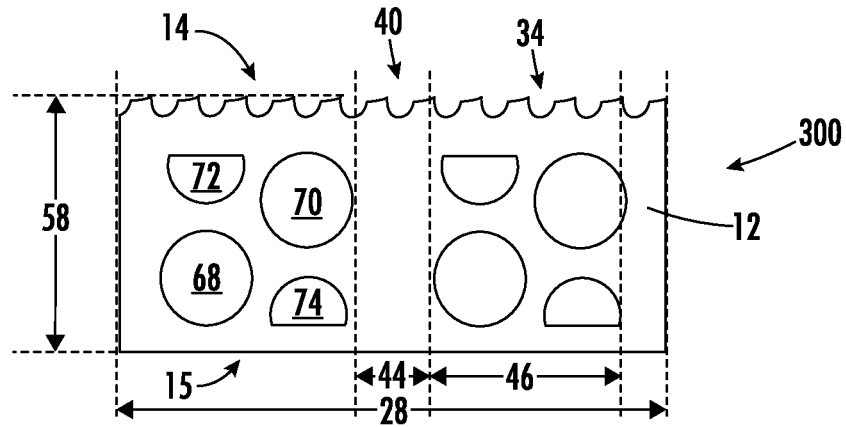
FIG. 15 is a side plan view of one embodiment of a sidewall before shaping to the cylindrical structure, according to an exemplary embodiment.

FIGS. 12-13 show embodiments of hole saw 300 with three complete openings 66, 68, and 70 and three partial holes 72, 74, and 76; FIGS. 14-15 show embodiments of hole saw 300 with two complete openings 68 and 70 and two partial holes 72 and 74; and FIGS. 16-17 show embodiments of hole saw 300 with one complete opening 68) and one partial hole 72. Solid regions 40 and/or hole regions 34 are substantially evenly spaced such that one group is located within each 180-degree section around the circumference 28 of hole saw 300. As illustrated, FIGS. 12-17 have different widths 44 of solid region 40 for different diameter 26 hole saws 100, this results in different ratios of the solid region 40 to total sidewall 12 area.

FIG. 12 shows one embodiment of hole saw 300 with a diameter 26 between 2.5 inches and 3 inches (e.g., a circumference 28 between 2.5 π and 3 π (approximately 7.85 inches to 9.43 inches)) with two solid regions 40. Each solid region 40 has a width 44 between 2 inches and 3 inches. A ratio of the solid regions 40 to the total area is between 40% and 60%, specifically between 45% and 55%. In a specific embodiment of FIG. 12, hole saw 300 has a diameter 26 of 2.875 inches (2⅞ inches) and two solid regions 40, each with a width 44 of approximately 2.292 inches, and a ratio of the solid regions 40 to the total area is approximately 50.75%.

FIG. 13 shows another embodiment of hole saw 300 with a diameter 26 between 1.5 to 2.5 inches (e.g., a circumference 28 between 1.5 π and 2.5 π inches; e.g., approximately 4.71 to 7.85 inches) with two solid regions 40. Each solid region 40 has a width 44 between 0.75 inches and 2.25 inches. A ratio of the solid regions 40 to the total area is between 20% and 40%, specifically between 25% and 35%. In a specific embodiment of FIG. 13, hole saw 300 has a diameter 26 of 2 inches and two solid regions 40, each with a width 44 of approximately 0.913 inches, resulting in a ratio of the solid regions 40 to the total area of approximately 29.1%.

FIGS. 14 and 15 show hole saw 300 with two complete openings 68 and 70 and two partial openings 72 and 72. Various embodiments have greater or fewer openings and/or have larger or smaller hole diameters 78.

FIG. 14 shows another embodiment of hole saw 300 with a diameter 26 between 1.75 to 2.25 inches with two solid regions 40. Each solid region 40 has a width 44 between 1.25 inches and 1.75 inches. A ratio of the solid regions 40 to the total area is between 40% and 60%, specifically between 45% and 55%. In a specific embodiment of FIG. 14, hole saw 300 has a diameter 26 of 1.921875 inches (e.g., 1$^{59}$/$_{64}$ inches) and two solid regions 40. In this configuration, each solid region 40 has a width 44 of approximately 1.591 inches, resulting in a ratio of the solid regions 40 to the total area of approximately 52.7%.

FIG. 15 shows another embodiment of hole saw 300 with a diameter 26 between 1 to 1.5 inches with two solid regions 40. Each solid region 40 has a width 44 between 0.75 inches and 2.25 inches. A ratio of the solid regions 40 to the total area is between 20% and 35%, specifically between 25% and 30%. In a specific embodiment of FIG. 15, hole saw 300 has a diameter 26 of 1.3125 inches (e.g., 1$^{5}$/$_{16}$ inches) and two solid regions 40. In this configuration, each solid region 40 has a width 44 of approximately 0.559 inches, resulting in a ratio of the solid regions 40 to the total sidewall 12 area of approximately 27.11%.

FIG. 16 shows another embodiment of hole saw 300 with a diameter 26 between 1 to 1.5 inches with one solid region 40. Solid region 40 has a width 44 between 1 inch and 1.25 inches. A ratio of the solid regions 40 to the total area is between 50% and 65%, specifically between 57% and 63%. In a specific embodiment of FIG. 16, hole saw 300 has a diameter 26 of 1.25 inches (e.g., 1¼ inches) and one solid region 40. Solid region 40 has a width 44 of approximately 1.172 inches, resulting in a ratio of the solid regions 40 to the total sidewall 12 area of approximately 59.7%.

FIG. 17 shows another embodiment of hole saw 300 with a diameter 26 between 0.5 to 1 inches with one solid region 40. Solid region 40 has a width 44 between 0.5 inches and 0.65 inches. A ratio of the solid region 40 to the total area is between 35% and 50%, specifically between 40% and 45%. In a specific embodiment of FIG. 17, hole saw 300 has a diameter 26 of 0.875 inches (e.g., ⅞ inches) and one solid region 40. Solid region 40 has a width 44 of approximately 0.584 inches, resulting in a ratio of solid region 40 to the total sidewall 12 area of approximately 42.5%.

FIGS. 18-19 show various embodiments of a hole saw 400, according to an exemplary embodiment. Hole saw 400 is substantially the same as hole saw 10 except for the differences discussed herein. In general, hole saw 400 includes one hole region 34 and one solid region 40. In this way, hole saw 400 includes fewer opening groups and/or openings within each group than hole saws 10, 100, 200, or 300. In specific embodiments, hole saw 400 has a smaller diameter 26 than hole saws 10, 100, 200, or 300 with fewer holes due to the smaller size. As illustrated in FIGS. 18-19, different sized hole diameters 78 directly affect hole region 34 width 46. In addition, different sized solid regions 40 may be used. In various embodiments of FIGS. 18-19, hole saw 400 has a $^{9}$/$_{16}$, ⅝, $^{21}$/$_{32}$, or $^{13}$/$_{16}$ inch diameter 26.

Figure 20:
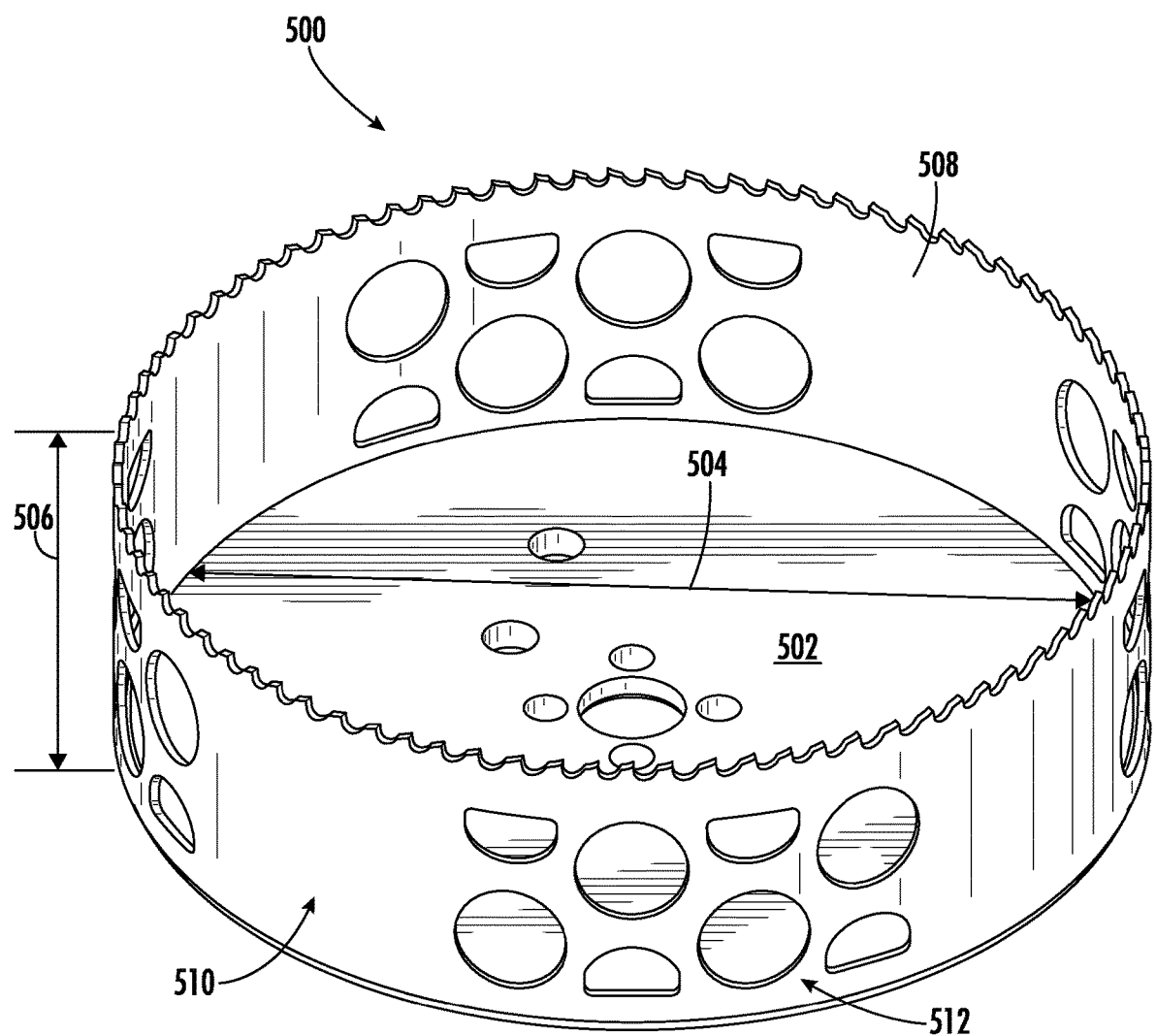
FIG. 20 is a top perspective view of a large diameter or wide hole saw, according to an exemplary embodiment.
Figure 21:
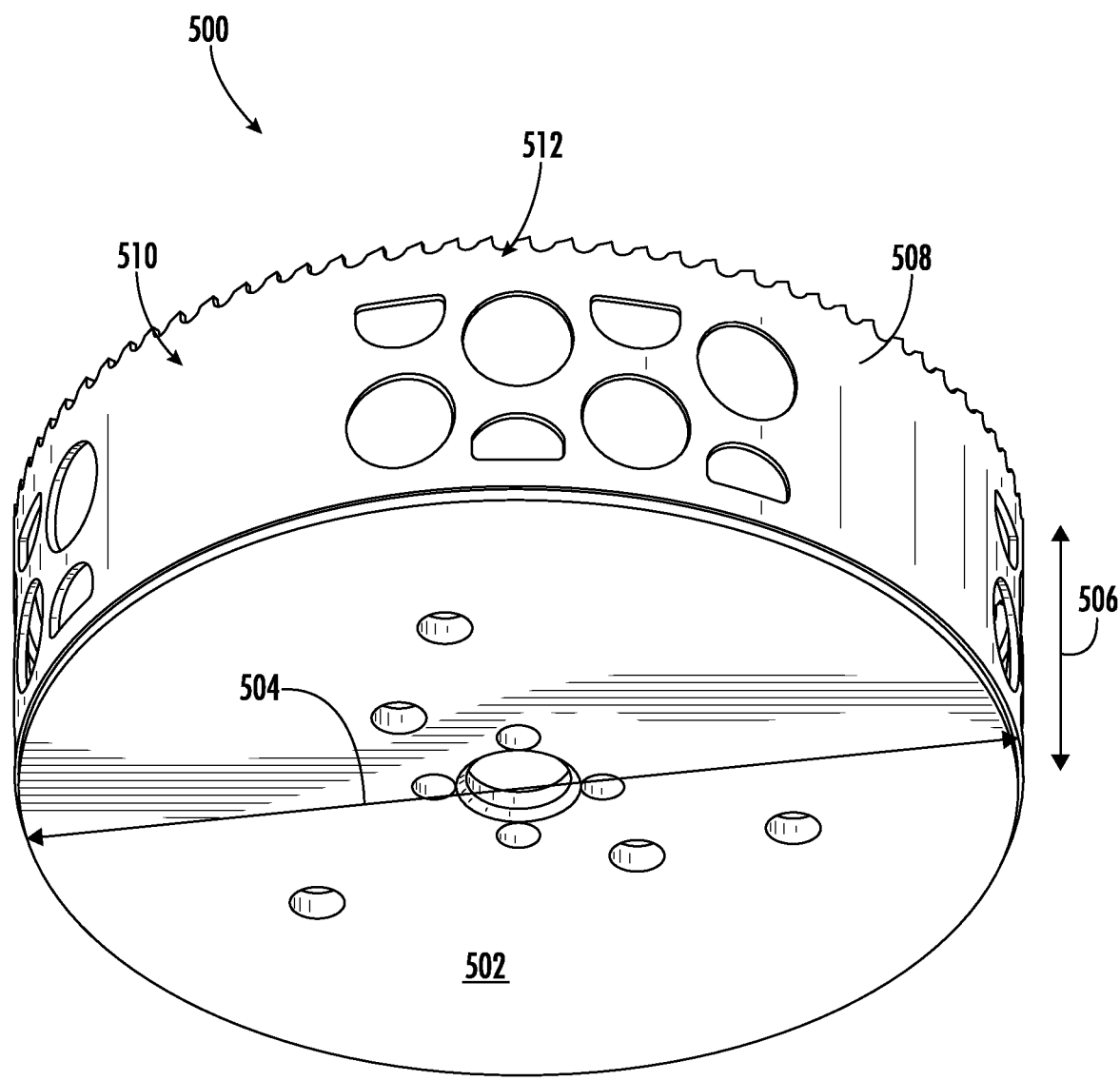
FIG. 21 is a bottom perspective view of the hole saw of FIG. 20, according to an exemplary embodiment.

FIGS. 20-21 show top and bottom perspective views of a large diameter or wide hole saw 500, according to an exemplary embodiment. Wide hole saw 500 is substantially the same as hole saws 10, 100, 200, 300, and 400, except for the differences discussed herein. Specifically, FIGS. 20-21 show a wide hole saw 500 with an endcap 502 that has a diameter 504 that is greater than twice the height 506 of sidewall 508. In various embodiments, wide hole saw 500 has an endcap 502 with a diameter 504 that is equal to or greater than 2, 2.25, 2.5, 2.75, 3, 4 or more times the height 506 of sidewall 508. Applicant has found that this configuration enables hole saw 500 to make a wider diameter 504 cut with either a thinner endcap 502 and/or a sidewall 508 with fewer solid regions 510, (e.g., permitting more and/or wider hole regions 512).

Figure 22:
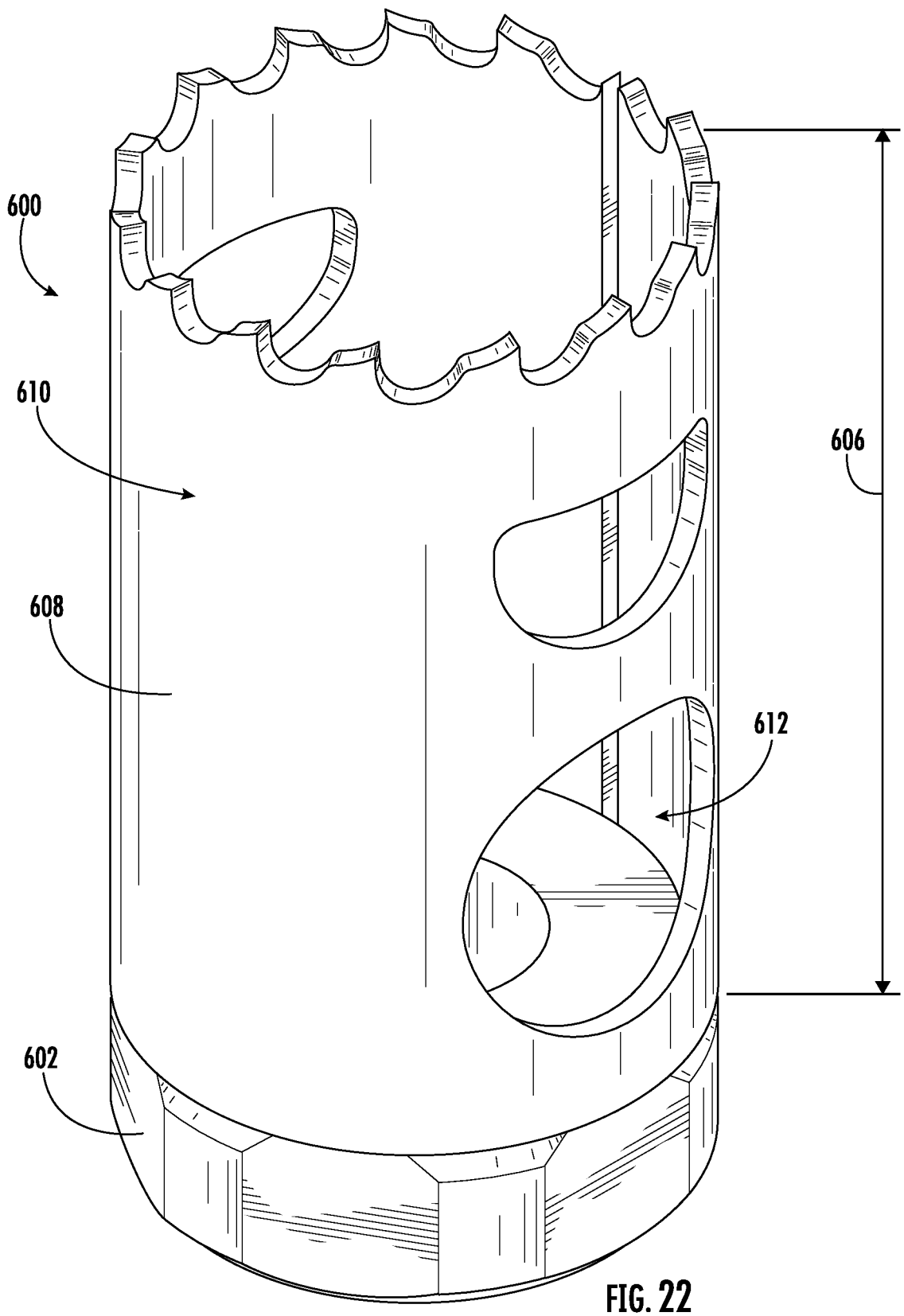
FIG. 22 is a top perspective view of an elongated hole saw, according to an exemplary embodiment.
Figure 23:
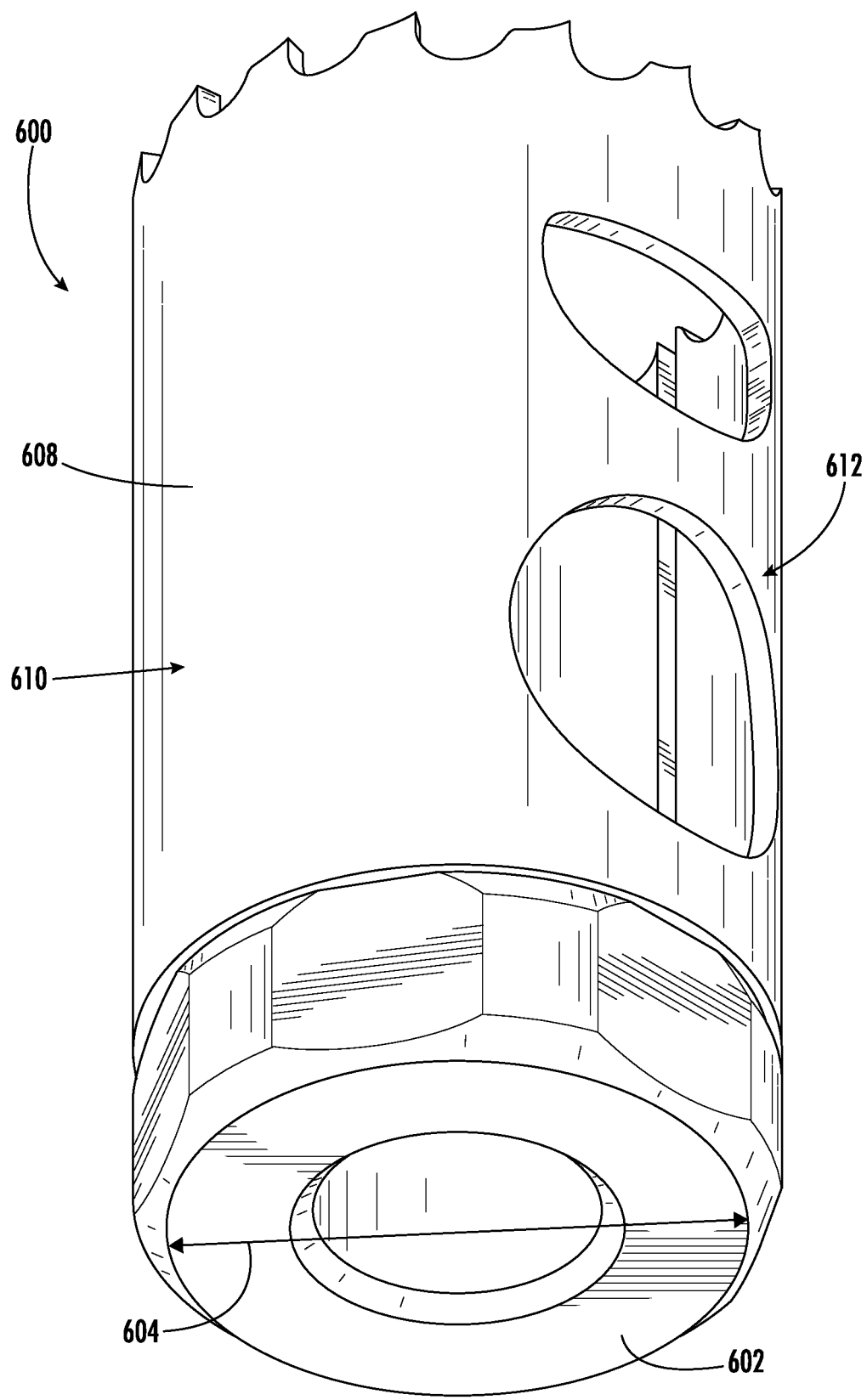
FIG. 23 is a bottom perspective view of the hole saw of FIG. 22, according to an exemplary embodiment.

FIGS. 22-23 show top and bottom perspective views of an elongated hole saw 600. Elongated hole saw 600 is substantially the same as hole saws 10, 100, 200, 300, 400, and 500 except for the differences discussed herein. Specifically, FIGS. 20-21 show elongated hole saw 600 with an endcap 602 that has a diameter 604 that is less than twice the height 606 of sidewall 608. In various embodiments, elongated hole saw 600 has an endcap 602 with a diameter 604 that is equal to or less than 1/2, 1/2.25, 1/2.5, 1/2.75, 1/3, 1/4 or more times the height 606 of sidewall 608. Applicant has found that this configuration enables sidewall 608 to couple solid regions 610 of sidewall 608 into a cylindrical body while maintaining one or more hole regions 612. Elongated hole saw 600 makes a deeper cut into a workpiece, while also maintaining access to remove dust and debris in hole regions 612.

Figure 24:
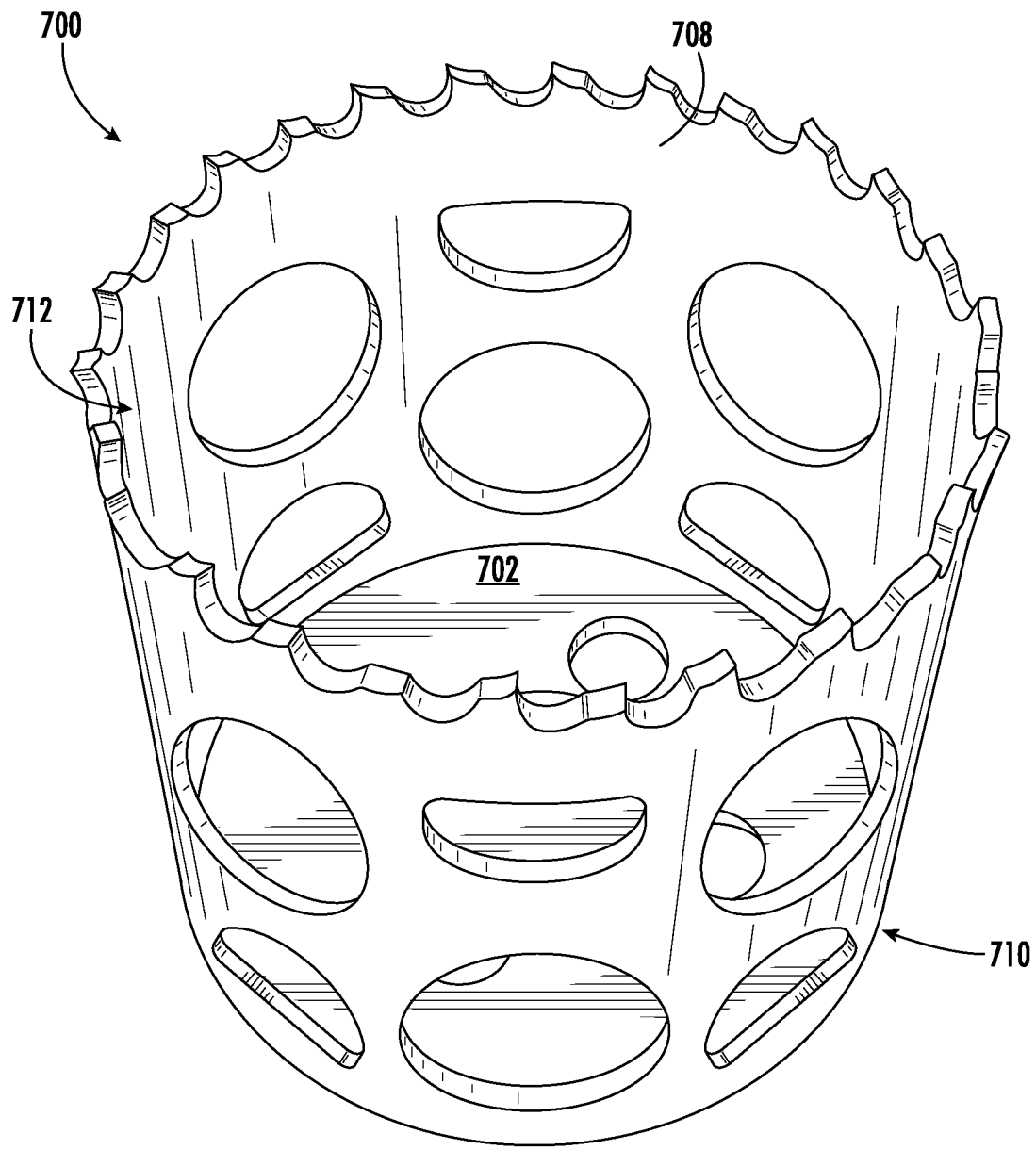
FIG. 24 is a top perspective view of a homologous hole saw, according to an exemplary embodiment.
Figure 25:
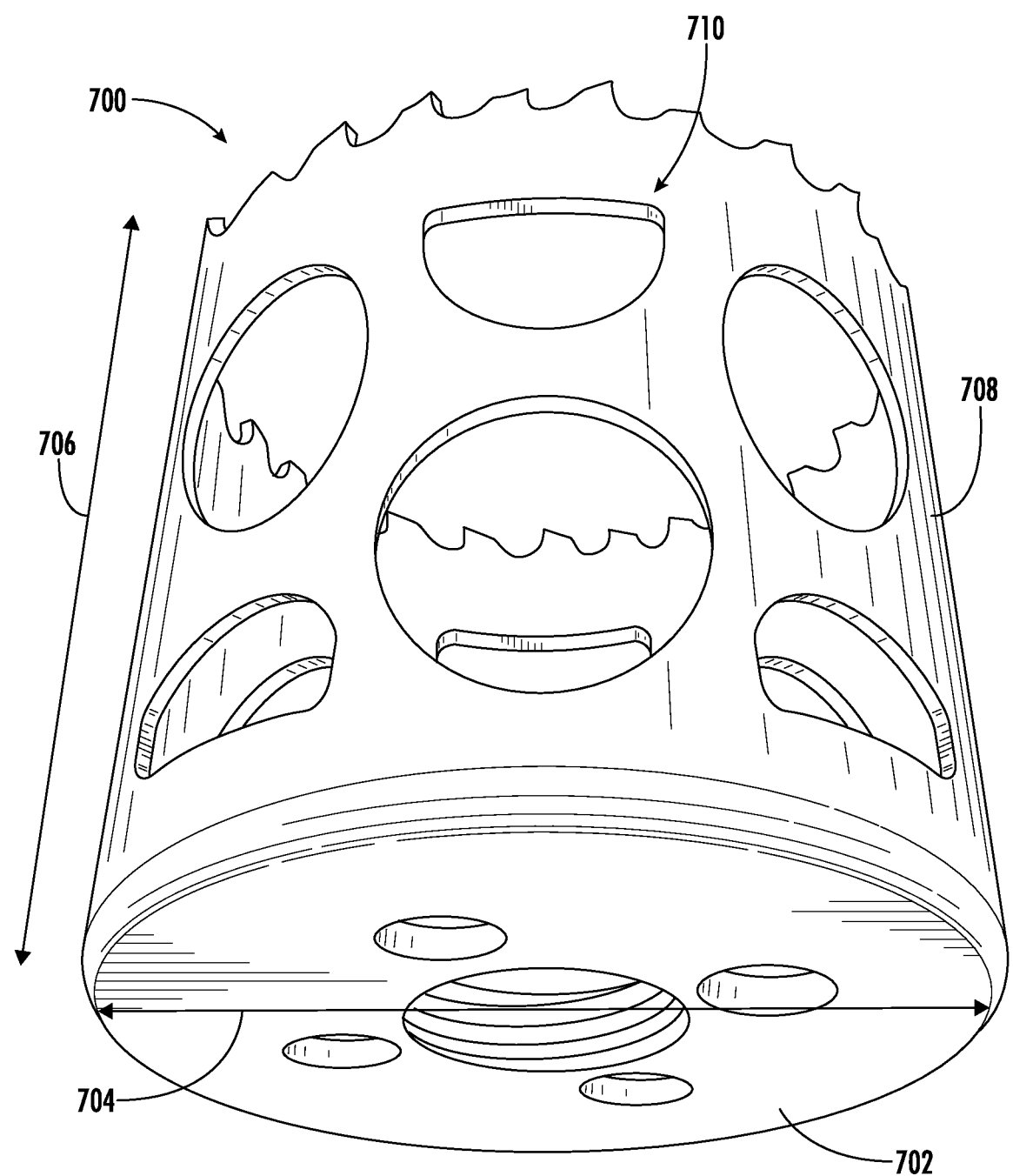
FIG. 25 is a bottom perspective view of the hole saw of FIG. 24, according to an exemplary embodiment.

FIGS. 24-25 show top and bottom perspective views of a homologous hole saw 700. Homologous hole saw 700 is substantially the same as hole saws 10, 100, 200, 300, 400, 500, and 600 except for the differences discussed herein. Specifically, FIGS. 24-25 show homologous hole saw 700 with an endcap 702 that has a diameter 704 that is between 1.5 times and 0.75 times the height 706 of sidewall 708. In various embodiments, homologous hole saw 700 has an endcap 702 with a diameter 704 that is between 1.5 and 0.75 times, specifically, between 1.25 and 0.90 times, and more specifically between 0.95 and 1.10 the height 706 of sidewall 708. Applicant has found that homologous hole saws 700 have thin endcaps 702 that provide adequate strength to support sidewalls 708 with hole regions 712.

In some embodiments, one or more of the hole saws discussed herein, including hole saws 10, 100, 200, 300, 400, 500, 600, and 700, are combined in a kit to facilitate different cut lengths and types.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred. Also, as used herein the article "a" is intended to include one or more than one component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another, or with the two members and any additional member being attached to one another. Such joining may be permanent in nature or alternatively may be removable or releasable in nature. Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths, and radii, as shown in the Figures are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. Also, in various embodiments, the present disclosure extends to a variety of ranges (e.g., plus or minus 30%, 20%, or 10%) around any of the absolute or relative dimensions disclosed herein or determinable from the Figures.

What is claimed is:

1. A hole saw, comprising:
   an endcap; and
   a sidewall, the sidewall comprising:
      a cutting edge at a first end;
      a second end opposite the cutting edge, the second end coupled to the endcap;
      a first circular opening extending through the sidewall; and
      a first partial circular opening extending through the sidewall, the first partial opening comprising an arc portion and a straight portion extending in a line from a first end of the arc to a second end of the arc, wherein a first distance between the straight portion and the cutting edge is less than a second distance between the arc portion and the cutting edge;
      wherein the first partial circular opening has a smaller area than the first circular opening; and
      wherein the first partial circular opening is spaced a distance from the cutting edge such that there is solid area in a longitudinal direction of the sidewall between the first partial circular opening and the cutting edge.

2. The hole saw of claim 1, further comprising a second circular opening extending through the sidewall, wherein the second circular opening has a larger diameter than the first circular opening.

3. The hole saw of claim 1, further comprising a second opening, wherein the first circular opening and the second opening are spaced from each other in a circumferential direction along the sidewall such that the first circular opening is not located above the second opening in the longitudinal direction of the sidewall.

4. The hole saw of claim 3, wherein the first circular opening and first partial circular opening are aligned in the longitudinal direction of the sidewall such that at least portion of the first partial circular opening overlaps with the first circular opening.

5. The hole saw of claim 4, wherein the first partial circular opening and second opening are spaced from each other in the longitudinal direction such that the first partial circular opening is located closer to the cutting edge than the second opening.

6. The hole saw of claim 5, wherein the second opening is a second partial circular opening.

7. The hole saw of claim 3, wherein the second opening is a second partial circular opening, and wherein the second partial circular opening comprises an arc portion and a straight portion, wherein the straight portion of the second partial circular opening faces the second end.

8. The hole saw of claim 1, further comprising:
   a first group of openings comprising the first circular opening and the first partial circular opening;
   a second group of openings extending through the sidewall; and
   a solid region without openings in the sidewall located between the first group of openings and the second group of openings.

9. The hole saw of claim 8, further comprising a circumferential length of the solid region that extends from one end of the first group of openings to an opposite end of the second group of openings, wherein a ratio of the circumferential length is between 30% and 45% of a total circumference of the sidewall.

10. The hole saw of claim 9, further comprising a width measured between widest lateral edges of the first group of openings; wherein the circumferential length is within 50% of the width of the first group of openings.

11. The hole saw of claim 10, wherein a total circumferential length of all solid regions is between 20% and 65% of the total circumference of the sidewall.

12. The hole saw of claim 8, wherein the second group of openings further comprises a second circular opening and a second partial circular opening.

13. The hole saw of claim 12, wherein the first group of openings comprises three circular openings and three partial circular openings; and wherein the second group of openings comprises three circular openings and three partial circular openings.

14. The hole saw of claim 1, wherein the shape of the first partial circular opening is a semicircular shape.

15. A hole saw, comprising:
an endcap forming a base and configured to couple to an arbor; and
a cylindrical sidewall extending along a longitudinal axis and coupled to the endcap, the sidewall comprising:
a cutting edge at a first end;
a second end opposite the cutting edge, the second end is coupled to the endcap;
a first group of circular openings comprising a first circular opening and a first partial circular opening that extend through the sidewall, wherein the first circular opening is located closer to the cutting edge than the first partial circular opening, and the first partial circular opening has a smaller area than the first circular opening, the first group of circular openings defining a first longitudinal tangent line that is parallel to the longitudinal axis and tangential to one of the circular openings of the first group;
a second group of circular openings comprising a second circular opening and a second partial circular opening that extend through the sidewall, the second group of circular openings defining a second longitudinal tangent line that is parallel to the longitudinal axis and tangential to one of the circular openings of the second group; and
a solid area between the first and second groups of circular openings, the solid area extending without openings in a circumferential direction between the first and second longitudinal tangent lines and in a longitudinal direction from the second end to the cutting edge.

16. The hole saw of claim 15, wherein the first group comprises three circular openings and three partial circular openings that extend through the sidewall.

17. The hole saw of claim 15, wherein the solid area includes a seam that joins two edges of the sidewall together to form the cylindrical sidewall into a circular body.

18. The hole saw of claim 15, wherein the sidewall is welded to the endcap.

19. The hole saw of claim 15, wherein the first group of circular openings comprises a plurality of different sized circular openings each having a different diameter.

20. The hole saw of claim 15, wherein the first circular opening in the first group of circular openings has a different diameter than the second circular opening in the second group of circular openings.

21. The hole saw of claim 15, wherein the first and second circular openings have different diameters than the first and second partial circular openings.

22. A hole saw, comprising:
an endcap configured to couple to an arbor; and
a cylindrical sidewall coupled to the endcap, the sidewall comprising:
a cutting edge at a first end;
a second end opposite the cutting edge, the second end coupled to the endcap;
a first group of openings comprising a circular opening, a first partial circular opening, and a second partial circular opening that each extend through the sidewall, the first partial circular opening comprises an arc portion and a straight portion extending in a line from a first end of the arc to a second end of the arc, wherein the first partial circular opening is located closer to the cutting edge than the second partial circular opening, and wherein the first partial circular opening has a smaller area than the first circular opening;
a second group of openings comprising a second circular opening, a third partial circular opening, and a fourth partial circular opening that each extend through the sidewall, wherein the third partial circular opening is located closer to the cutting edge than the fourth partial circular opening; and
a solid area between the first and second groups of circular openings, wherein the solid area is a contiguous, unbroken section of material that extends without openings in a circumferential direction from the first group of openings to the second group of openings and in a longitudinal direction from the second end to the cutting edge.

23. The hole saw of claim 22, wherein the first circular opening of the first group of openings has a diameter that is the same as a diameter of the second circular opening of the second group of openings, and wherein the first partial circular opening of the first group of openings has a diameter that is the same as a diameter of the third partial circular opening of the second group of openings.

24. The hole saw of claim 23, wherein the diameters of the first and second circular openings are greater than the diameters of the first and third partial circular openings.

* * * * *